(12) United States Patent
Dejima et al.

(10) Patent No.: US 6,934,440 B2
(45) Date of Patent: Aug. 23, 2005

(54) OPTICAL SWITCH AND OPTICAL SWITCH DEVICE

(75) Inventors: Norihiro Dejima, Chiba (JP); Norio Chiba, Chiba (JP); Kenji Kato, Chiba (JP); Toshiya Kubo, Chiba (JP); Hiromitsu Nakayama, Chiba (JP); Takashi Niwa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/718,116

(22) Filed: Nov. 20, 2003

(65) Prior Publication Data

US 2004/0131306 A1 Jul. 8, 2004

(30) Foreign Application Priority Data

Dec. 2, 2002 (JP) .......................................... 2002-349856
May 12, 2003 (JP) .......................................... 2003-133011

(51) Int. Cl.[7] ................................................ G02B 6/35
(52) U.S. Cl. ............................. 385/18; 385/16; 385/17; 385/22
(58) Field of Search ................................ 385/16–23, 36

(56) References Cited

U.S. PATENT DOCUMENTS

| | | | | | |
|---|---|---|---|---|---|
| 5,960,133 A | * | 9/1999 | Tomlinson | .................... | 385/18 |
| 6,259,835 B1 | * | 7/2001 | Jing | .............................. | 385/18 |
| 6,317,532 B1 | * | 11/2001 | Lin et al. | ....................... | 385/18 |
| 6,542,656 B1 | * | 4/2003 | Hill | ............................... | 385/18 |
| 6,650,804 B2 | * | 11/2003 | Mills et al. | .................... | 385/17 |
| 6,842,555 B2 | * | 1/2005 | Bhattacharya et al. | ......... | 385/18 |

* cited by examiner

Primary Examiner—Frank G. Font
Assistant Examiner—Derek L. Dupuis
(74) Attorney, Agent, or Firm—Adams & Wilks

(57) ABSTRACT

An optical switch has at least first, second, and third optical fibers disposed generally parallel to each other and spaced at non-equal intervals in a direction substantially perpendicular to an optical axis of each of the optical fibers. The optical fibers have tip portions disposed approximately along a straight line extending in a direction substantially perpendicular to the optical axis of each of the optical fibers. A first non-movable guiding structure guides a beam of light emitted from the first optical fiber to the second optical fiber along a first optical path disposed between the tip portion of the first optical fiber and the tip portion of the second optical fiber. A second movable guiding structure guides the beam emitted from the first optical fiber to the third optical fiber along a second optical path disposed between the tip portion of the first optical fiber and the tip portion of the third optical fiber so that a length of the second optical path is substantially equal to a length of the first optical path.

20 Claims, 15 Drawing Sheets

PRIOR ART
FIG. 13
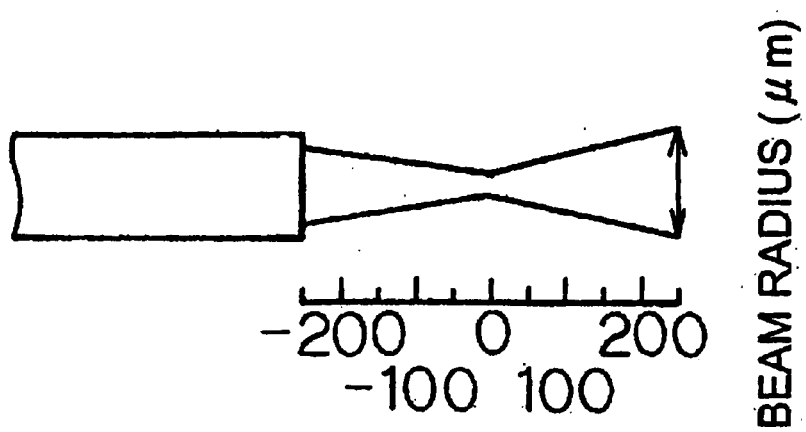
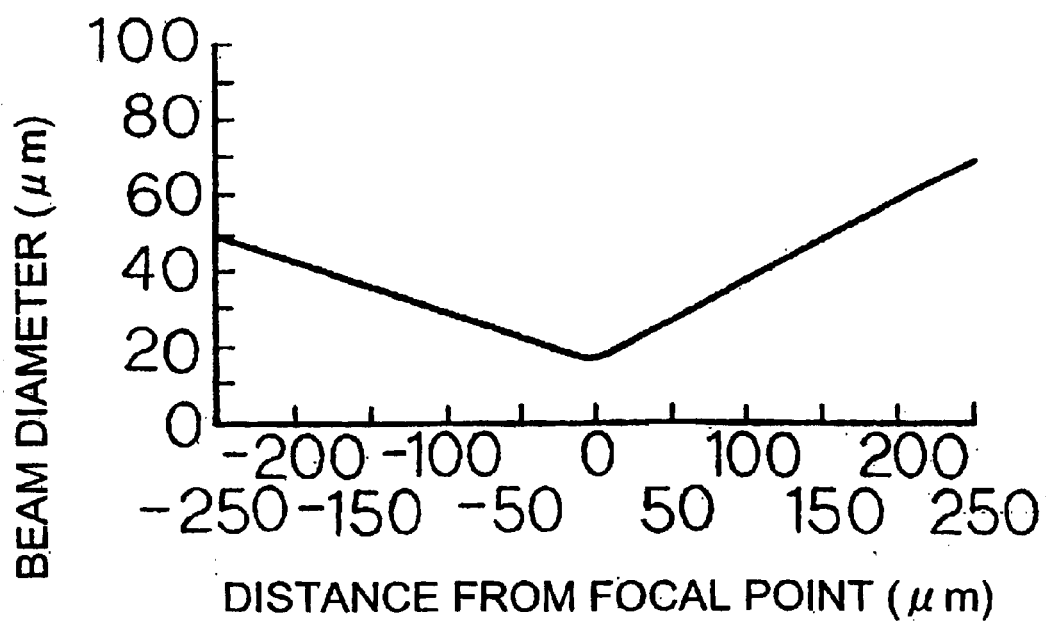
FIG. 14
PRIOR ART

0 μm

DISTANCE FROM FOCAL POINT (μm)

FIG. 17A
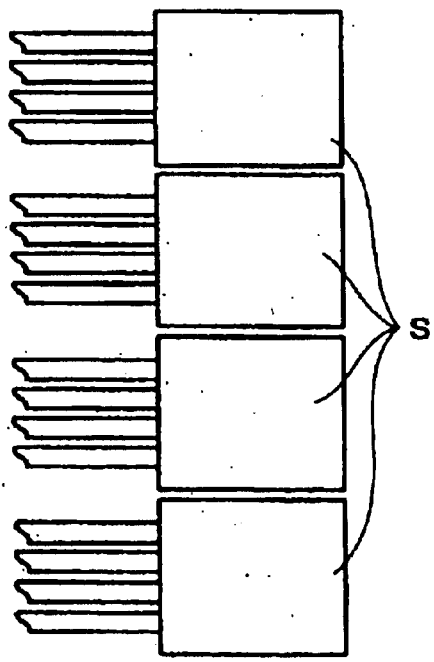
FIG. 17B
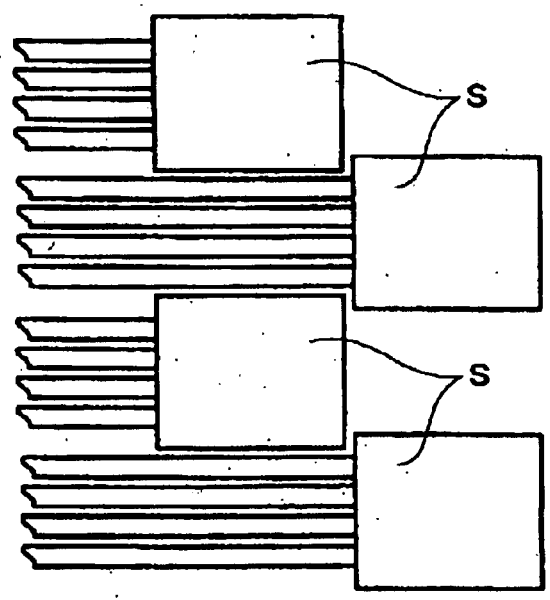
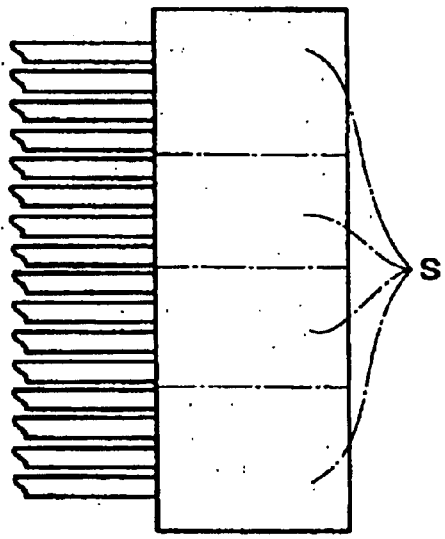
FIG. 17C

OPTICAL SWITCH AND OPTICAL SWITCH DEVICE

BACKGROUND OF THE INVENTION

1. Field of the Invention

The present invention relates to an optical switch and an optical switch device.

2. Description of the Related Art

Various optical devices are conventionally used in an optical communication field, etc. For example, there is an optical device constructed so as to have plural optical fibers and mirrors as an optical switch device for switching and interrupting the optical path of an optical fiber transmission line.

As shown in FIGS. 11 and 12, the optical switch device is constructed such that plural optical fibers 22a to 22d are aligned in parallel with each other on a substrate 21, and a movable reflection member 23 constructed by combining two reflection faces (mirrors) 23a, 23b is arranged in front of these optical fibers so as to be vertically moved by an unillustrated-cantilever (e.g., see patent literature 1). In this construction, a magnetic material is arranged in the cantilever and an electromagnet is arranged below the substrate 21 although this arrangement is not illustrated. The cantilever is vertically moved by operating the electromagnet so that the movable reflection member 23 can be switched to an advancing state into the front of the tips of the optical fibers 22b, 22c and a state retreated from this front. In the advancing state of the movable reflection member 23 into the front of the tips of the optical fibers 22b, 22c, reflection faces 23a, 23b are located within the optical paths of beams from the optical fibers 22a, 22c. Therefore, an optical path from the optical fiber 22a to the optical fiber 22b and an optical path from the optical fiber 22c to the optical fiber 22d are formed in cooperation with fixed reflection faces 24a, 24b. In contrast to this, in the state of the movable reflection member 23 retracted from the front of the tips of the optical fibers 22b, 22c, no reflection faces 23a, 23b are located within the optical paths of the optical fibers 22a, 22c, and an optical path from the optical fiber 22a to the optical fiber 22d and an optical path from the optical fiber 22c to the optical fiber 22b are formed by using the deeply fixed reflection faces 24a, 24b. The optical switch for switching the optical paths of the optical fibers is constructed in this way.

[Patent Literature 1]

JP-A-2000-137177 (paragraphs [0017] to [0027] and FIG. 1).

In the above conventional construction, the optical fibers 22a to 22d are arranged in parallel with each other at an equal interval (pitch A). This arrangement has the advantage that the optical fibers 22a to 22d can be easily held and constructed. However, in such a construction that the movable reflection plates 23a, 23b and the fixed reflection plates 24a, 24b are arranged in front of the optical fibers 22a to 22d arranged in parallel with each other at the equal interval, there is a possibility that the difference in optical path length before and after the switching of the optical paths is increased. Namely, as shown in FIG. 12, the optical path from the optical fiber 22a to the optical fiber 22b and the optical path from the optical fiber 22c to the optical fiber 22d in the inserting case of the reflection plates 23a, 23b differ in length from the optical path from the optical fiber 22a to the optical fiber 22d and the optical path from the optical fiber 22c to the optical fiber 22b in the uninserting case of the reflecting plates 23a, 23b. Concretely, the optical path length between end face from the optical fiber 22a to the optical fiber 22b is E+A+E=A+2E. The optical path length between end portions from the optical fiber 22c to the optical fiber. 22d is also E+A+E=A+2E. However, the optical path length between end portions from the optical fiber 22a to the optical fiber 22d is E+A+A+A+E=3A+2E. The optical path length between end portions from the optical fiber 22c to the optical fiber 22b is E+D+A+D+E=A+2D+2E. Thus, a large difference in optical path length is caused before and after the switching using the optical switch.

In an optical device such as an optical switch, a fiber collimator of a relatively small diameter having a graded index optical fiber is used in many cases. A beam emitted from the fiber collimator is once converged and is then again widened and advanced. As one example, as shown by the situation of the advance of the emitted light in Table 1 and FIGS. 13 and 14, the beam diameter is changed in accordance with the distance from the end face of the optical fiber.

TABLE 1

| Distance ($\mu$m) | Beam radius ($\mu$m) |
| --- | --- |
| −250 | 48.9 |
| −200 | 42.4 |
| −150 | 36 |
| −100 | 29.5 |
| −50 | 23.1 |
| 0 | 16.6 |
| 50 | 27.2 |
| 100 | 37.8 |
| 150 | 48.4 |
| 200 | 59.1 |
| 250 | 69.8 |

Therefore, when this fiber collimator is assembled into the optical device, a pair of optically connected fiber collimators can be held with high coupling efficiency by arranging this pair of fiber collimators in a position relation for optimizing the distance between their end portions on the basis of the converging and enlarging states of light. Namely, when the same fiber collimator is used on the emitting side and the incident side, it is preferable to set the fiber collimator so as to have a focal point in a halfway spot.

The arranging position of the fiber collimator within the optical device is determined in this way. However, in the case of the construction as shown in FIG. 12, for example, when the optical fiber is arranged so as to optimize the optical path length (A+2E) of the optical path before the switching, there is a high possibility that light is incident to another optical fiber while the light state is inappropriate as it is in an excessively large state of the beam diameter, at the optical path length (3A+2E, A+2D+2E) of the optical path after the switching. In this case, insertion loss is increased.

Here, the relation of the distance between the pair of optical fibers and the coupling efficiency will be explained. FIGS. 15A to 15C show a case in which the position for focusing the beam from one (left-hand side) optical fiber (the position for setting the beam radius to 16.6 $\mu$m as a minimum radius) is set to 0 $\mu$m, and the distance is displayed, and the position of the tip end face of the other (right-hand side) optical fiber is changed. Here, when it is considered whether the focal point positions from both the optical fibers are conformed to each other, the coupling efficiency is calculated, by the following Marcus formula.

$$\eta = [(2W_1 W_2)/(W_1^2 + W_2^2)]^2 \qquad \text{[Formula 1]}$$

η: coupling efficiency $W_1$: beam radius from one optical fiber $W_2$: beam radius from the other optical fiber The coupling efficiency is calculated on the basis of this Marcus formula and loss is further calculated. The calculated results are shown in Table 2 and FIG. 16. Here, as one example, the beam of about 50 μm in radius is emitted and the focal point is formed at a distance of 250 μm from the emitting end. Namely, the fiber collimator is used so as to set the beam diameter to a BW (Beam Waist) point as a minimum beam radius and having a 3.5 distribution constant and a 125 μm diameter (100 μm in core diameter).

TABLE 2

| Distance (μm) | Coupling efficiency (%) | Loss (dB) |
| --- | --- | --- |
| −250 | 37.1 | 4.31 |
| −200 | 46.1 | 3.36 |
| −150 | 57.8 | 2.38 |
| −100 | 73.1 | 1.36 |
| −50 | 89.8 | 0.47 |
| 0 | 100 | 0 |
| 50 | 79.1 | 1.02 |
| 100 | 54.2 | 2.66 |
| 150 | 37.7 | 4.24 |
| 200 | 27.1 | 5.67 |
| 250 | 20.3 | 6.93 |

As can be seen from these results, the coupling efficiency is best and the loss is reduced when both the optical fibers are arranged such that the distance between their tip portions is equal to 500 μm so as to conform the focal points (BW points) of both the optical fibers as shown in FIG. 15A. However, the coupling efficiency is greatly reduced and the loss is increased even when the distance between both the optical fibers is slightly receded. For example, as shown in FIG. 15B, when the optical fiber on the emitting side (left-hand side) is fixed as it is and the optical fiber on the incident side (right-hand side) is separated by 100 μm, the coupling efficiency is reduced until 54.2%. As shown in FIG. 15C, the coupling efficiency is also reduced to 73.1% when the optical fiber on one side (left-hand side) is fixed as it is and the optical fiber on the other side (right-hand side) approaches by 100 μm. To restrain the loss to 0.5 dB or less, it is necessary to arrange both the optical fibers so as to optically couple the optical fibers in the range from +25 μm to −50 μm.

Thus, the coupling efficiency is greatly reduced and the loss is increased even when the distance between the optically connected optical fibers is changed only by several ten μm. Accordingly, when the optical switch device is constructed so as to change the optical path length before and after the switching of the optical switch as mentioned above, there is a high possibility that, even when light is preferably propagated with high coupling efficiency in one of the optical path before the switching and the optical path after the switching, the coupling efficiency is low in the other and the propagation of light becomes bad.

Further, in the conventional construction shown in FIGS. 11 and 12, the reflection plate 24a on the fixing side is located in front of the optical fibers 22a and 22b and reflects the beam. The reflection plate 24b is located in front of the optical fibers 22c and 22d and reflects the beam. Therefore, it is necessary to set the reflection plates 24a, 24b to have a relatively large area. Further, the movable reflection plates 23a, 23b are integrated in a unit as the movable reflection member 23 so that the reflection plates 23a, 23b are large-sized. Thus, since the arranging area of the reflection plates (mirrors) is increased, the distance from the emission from the optical fibers 22a, 22c to the arrival at the reflection plates is necessarily lengthened so that the optical path lengths reaching the optical fibers 22b, 22d are lengthened. When the optical path length is lengthened, the optical path length has a large influence even when the relative shifts of the positions and the angles of the optical fibers 22a to 22d and the reflection plates 23a, 23b, 24a, 24b are small, thereby increasing the light loss. This means that a very precise and complicated assembly work is required. Further, since the movable reflection plate 23 is large-sized, it is necessary to set the cantilever as its driving means to be large-sized and increase the output of the electromagnet. Further, there is a fear that resonance frequency is reduced and switching speed must be reduced, which is not suitable for high speed optical communication. Further, since the entire optical switch is large-sized as a result, the number of optical switches able to be manufactured from one wafer is reduced. Therefore, a problem exists in that manufacture cost is raised.

Further, the use of the conventional optical switch is limited to the switching of the optical path. However, in the optical communication, a part having a function for attenuating the light amount is required in addition to the optical path switching functional part. When these functional parts of the different actions are used, the shapes of the functional parts are different from each other so that no functional parts can be aligned with each other and no arranging area thereof can be reduced. Further, problems exist in that the constructions of the functional parts are different from each other so that the used parts and their manufacturing processes are different from each other and no cost can be restrained.

SUMMARY OF THE INVENTION

Therefore, an object of the present invention is to provide an optical switch in which the optical path length of an optical path required in at least the optical communication among the optical paths constructed by plural optical fibers is reduced as much as possible, and the arranging area of a mirror is reduced in size and the optical path length is shortened. Further, another object of the present invention is to provide an optical switch in which the functional parts showing different actions can be aligned by setting one optical switch to have plural functions so that the arranging area can be reduced and the same parts can be used and manufactured in the same process, thereby restraining cost.

The present invention is characterized in an optical switch comprising plural optical fibers arranged in parallel with each other at non-equal intervals; fixing mirror means located in front of the plural optical fibers and able to guide a beam emitted from a first optical fiber to a second optical fiber; and movable mirror means able to be advanced and retreated in front of the plural optical fibers, and guiding the beam emitted from the first optical fiber to a third optical fiber, and able to form an optical path of substantially the same length as the optical path able to be constructed by the fixing mirror means from the first optical fiber to the second optical fiber when the movable mirror means is advanced in front of the optical fibers. It is preferable that the optical switch further comprises another fixing mirror means located in front of the plural optical fibers and able to guide the beam emitted from a fourth optical fiber to the third optical fiber, and another movable mirror means able to be advanced and retreated in front of the plural optical fibers, and able to guide the beam emitted from the fourth optical fiber to the second optical fiber when this another movable mirror means is advanced in front of the optical fibers.

Further, it is preferable that one or both of the optical path constructed by the another fixing mirror means from the fourth optical fiber to the third optical fiber, and the optical path constructed by the another movable mirror means from the fourth optical fiber to the second optical fiber substantially have the same lengths as the optical path constructed by the fixing mirror means from the first optical fiber to the second optical fiber and the optical path constructed by the movable mirror means from the first optical fiber to the third optical fiber.

In such a construction, the optical path lengths of all the optical paths constructible by combining the respective optical fibers, or all the optical paths except for one optical path can be set to be equal to each other, and a preferable propagating state of light can be secured with respect to these optical paths.

When the optical switch is used in the optical communication of an add-drop system, it is preferable that the first optical fiber is set to IN and one of the second optical fiber and the third optical fiber is set to OUT, and the other is set to DROP, and the fourth optical fiber is set to ADD. In this case, only the optical path from the fourth optical fiber set to ADD to the second or third optical fiber set to DROP may be different in length from the other optical paths. Further, the optical path from the fourth optical fiber set to ADD to the second or third optical fiber set to DROP may be interrupted on the way. In general, in the optical communication of the add-drop system, no problem is caused even when the propagating state of light is bad in only one optical path (optical path of ADD-DROP). Accordingly, this optical communication is particularly suitable for the application of the present invention.

The fixing mirror means and the another fixing mirror means include at least four fixing mirrors in total, and the movable mirror means and the another movable mirror means include at least four movable mirrors in total simultaneously movable so as to be advanced or retreated in front of the plural optical fibers. Otherwise, the fixing mirror means and the another fixing mirror means include at least four fixing mirrors in total, and the movable mirror means and the another movable mirror means include two movable mirrors in total simultaneously movable so as to be advanced or retreated in front of the plural optical fibers and able to construct the optical path in cooperation with one of the fixing mirrors.

Further, the present invention may also have plural optical fibers and switching means able to switch an optical path constructed by optically connecting the end portions of a pair of optical fibers to each other to a different optical path by changing the combination of the optical connections of the plural optical fibers. In this case, the plural optical fibers are arranged in parallel with each other at non-equal intervals and may be arranged in a relative position relation in which all the paths between the end portions of the optical fibers of the various optical paths switched by the switching means substantially have the same length.

Otherwise, the plural optical fibers are arranged in parallel with each other at the non-equal intervals and may be also arranged in a relative position relation in which all the other optical paths except for one optical path among the paths between the end portions of the optical fibers of the various optical paths switched by the switching means substantially have the same length. In this case, four optical fibers respectively used as at least ADD, DROP, IN and OUT are arranged to be used in the optical communication of the add-drop system. The plural optical fibers may be also arranged in a relative position relation in which, except for the optical paths constructed by the optical fiber used as ADD and the optical fiber used as DROP, the paths between the end portions of the optical fibers of the other optical paths (i.e., three optical paths of IN-OUT, IN-DROP and ADD-OUT) substantially have the same length.

In, the foregoing construction, similar to the above-mentioned case, all the optical paths constructed by combining the respective optical fibers, or all the optical paths except for one optical path are set to have the equal optical path length, and a preferred propagating state of light can be secured with respect to these optical paths.

The switching means includes the movable mirror and the fixing mirror and may switch the optical paths by moving the movable mirror to the position on the optical axis of the optical fiber and the position outside the optical axis.

In each construction of the present invention explained above, each of the movable mirror and the fixing mirror can preferably reflect only one beam. It is also preferable that the movable mirrors and the fixing mirrors are arranged by the same number as the number of portions ought to reflect the beam and required to construct the optical paths, and the movable mirror is formed at a size three times or less the beam diameter. In such a construction, each mirror can be made compact, and the mirror arranging area can be reduced so that the tip portions of the optical fibers are set to be closer to each other and the optical path length can be shortened. Thus, the allowance ranges with respect to the shifts of the positions and the angles of the optical fiber and each mirror are increased. Further, since the movable mirror is compact, the entire movable portion can be made compact and light in weight and switching speed can be increased by raising resonance frequency. Further, the output of a driving means such as an electromagnet, etc. can be reduced and restrained. Further, it is preferable to arrange all the mirrors at an angle of 45 degrees with respect to the optical axis of the optical fiber. Thus, the angle of the mirror with respect to the optical axis is uniformed and an optical adjustment such as alignment, etc. is easily made and dispersion in a manufacturing process can be reduced and restrained.

Further, in accordance with the present invention, a variable optical attenuator (VOA) for arbitrarily changing the propagating amount of light can be also constructed by controlling the position of the movable mirror with high accuracy using an electromagnetic actuator or an electrostatic actuator. In accordance with this construction, the propagating light amount can be controlled by electrically controlling the operation of the actuator and controlling the position of the movable mirror with high accuracy.

BRIEF DESCRIPTION OF THE DRAWINGS

FIG. 13 is a typical view showing the advancing situation of light emitted from an optical fiber.

FIG. 14 is a graph showing the relation of the distance of the light emitted from the optical fiber from a focal point and a beam radius.

FIG. 17A is a schematic plan view showing an example of an optical switch device including plural optical switches of the present invention. FIG. 17B is a schematic plan view showing another example of the optical switch device. FIG. 17C is a schematic plan view showing still another example of the optical switch device.

DETAILED DESCRIPTION OF THE PREFERRED EMBODIMENTS

The embodiment modes of the present invention will next be explained with reference to the drawings.

[First Embodiment Mode]

Figure 1A:
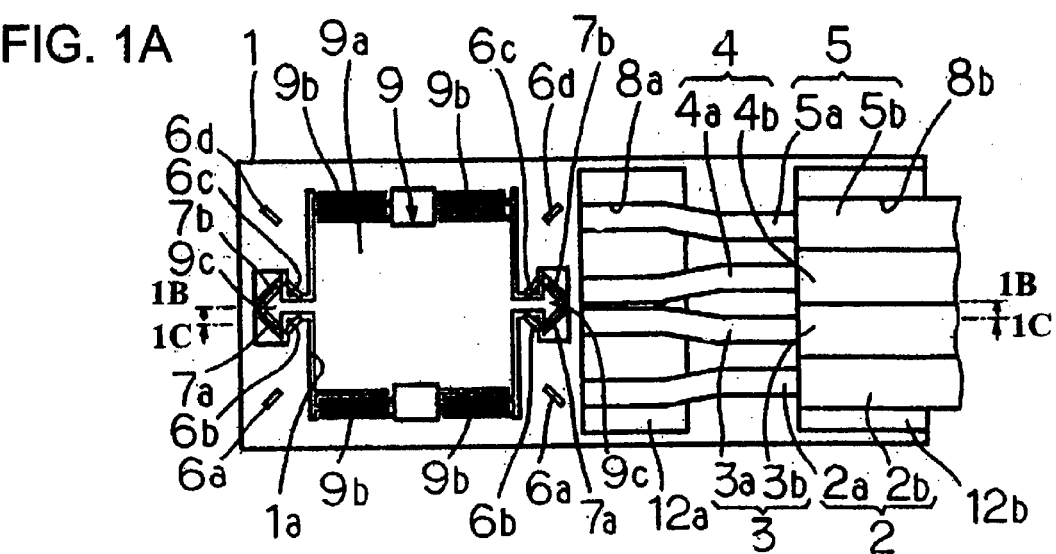
FIG. 1A is a plan view of a first embodiment mode of an optical switch of the present invention.
Figure 1B:
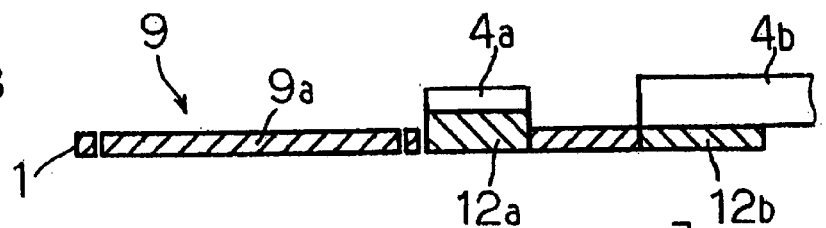
FIG. 1B is a cross-sectional view taken along line 1B—1B of FIG. 1A.
Figure 1C:
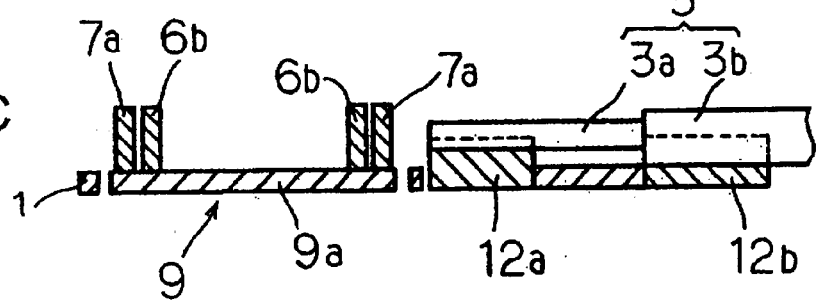
FIG. 1C is a cross-sectional view taken along line 1C—1C of FIG. 1A.
Figure 2A:
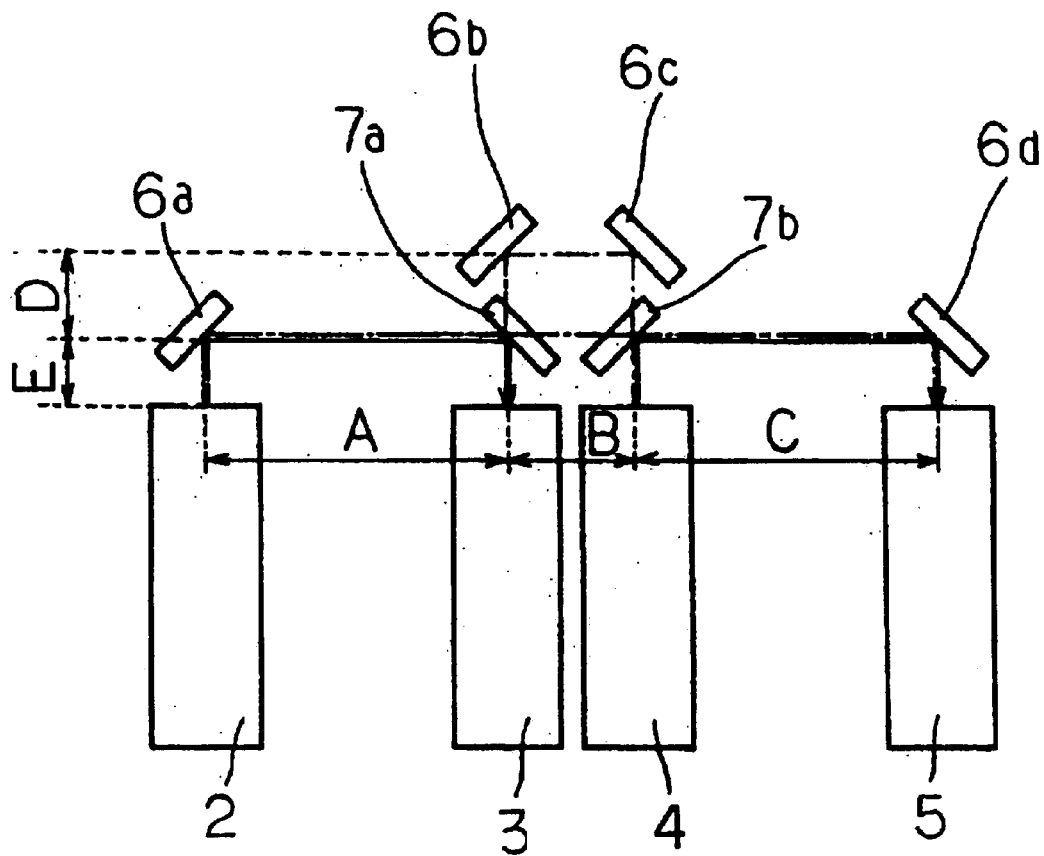
FIG. 2A is a typical view of a main portion of the optical switch shown in FIGS. 1A–1C.
Figure 2B:
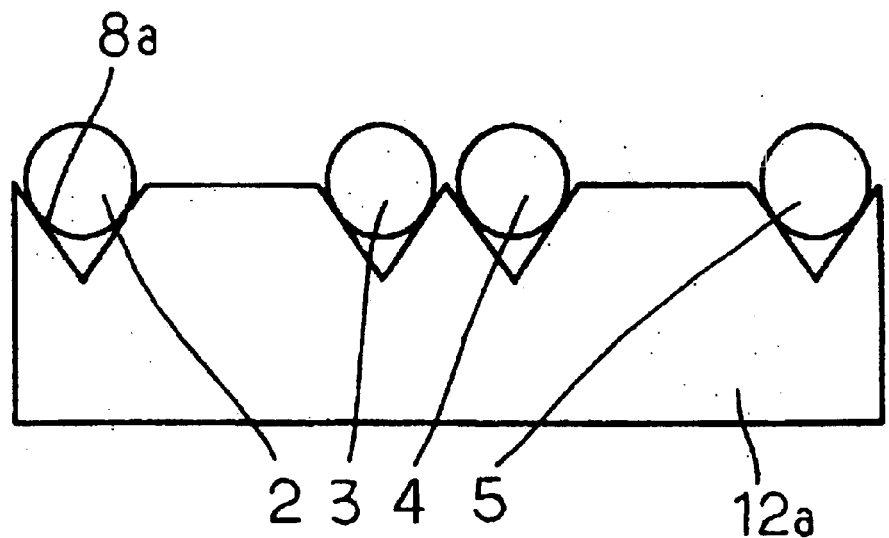
FIG. 2B is cross-sectional view of the optical switch of FIG. 2A.

FIGS. 1 and 2 show a first embodiment mode of an optical switch of the present invention. The basic construction of this optical switch will first be explained.

This optical switch has a substrate 1 as an optical switch main body, optical fibers 2 to 5 arranged on the substrate 1, fixing mirrors 6a to 6d, movable mirrors 7a, 7b, and an unillustrated driving means arranged above or below the substrate 1.

In this embodiment mode, the optical fibers 2 to 5 are constructed by coating portions or fibers 2b to 5b and uncovered bare portions 2a to 5a stripped off in their coatings and located at the tips of the coating fibers 2b to 5b. The coating portions 2b to 5b come in close contact with each other and are arranged in parallel with each other on the substrate 1. The bare portions 2a to 5a have diameters smaller than those of the coating portions 2a to 5a are arranged at non-equal intervals and the lengths of optical paths are adjusted as described later. Guide members 12a, 12b having guide grooves 8a for the bare portions 2a to 5a and guide grooves 8b for the coating portions 2b to 5b are formed in the substrate 1. The optical fibers 2 to 5 are positioned and fixed on the substrate 1 by inserting the optical fibers 2 to 5 into these guide grooves 8a, 8b. In this embodiment mode, the optical fibers 2 to 5 are divided into a set of optical fibers 2 and 4 and a set of optical fibers 3 and 5. One (e.g., optical fibers 2 and 4) of the sets is set to emitting side optical fibers, and the other set (e.g., optical fibers 3 and 5) is set to incident side optical fibers. The guide members 12a, 12b are not limited to the construction in which the guide members 12a, 12b are formed in the substrate 1 as in this embodiment mode. For example, the guide members 12a, 12b may be formed by glass, etc. separately from the substrate 1, and may be also arranged on the substrate 1. Further, a tape fiber may be also used as the optical fiber. When the tape fiber is used, a groove for guiding and fixing the tape fiber onto the substrate 1 is formed instead of the guide member 12b. The other constructions, operations, etc. in the case using the taper fiber are similar to those in the case using the illustrated optical fibers 2 to 5 constructed by the coating portions 2b to 5b and the bare portions 2a to 5a.

The fixing mirrors 6a to 6d are directly fixed onto the substrate 1. In contrast, the movable mirrors 7a, 7b are arranged in a movable portion 9 movable upward or downward with respect to the substrate 1. The movable portion 9 is located within a concave portion 1a formed in the substrate 1. The movable portion 9 is constructed by a plane portion 9a, a beam portion 9b for connecting this plane portion 9a to the inner circumferential face of the concave portion 1a and having a spring property, and a stage portion 9c continuously formed from the plane portion. The movable mirrors 7a, 7b are arranged on the stage portion 9c. As enlarged and typically shown in FIG. 2, when the optical switch is seen in a plane, the fixing mirror 6a is located in front of the tip portion of the bare portion 2a of the optical fiber 2, and the movable mirror 7a and the fixing mirror 6b are located in front of the tip portion of the bare portion 3a of the optical fiber 3. Further, the movable mirror 7b and the fixing mirror 6c are located in front of the tip portion of the bare portion 4a of the optical fiber 4, and the fixing mirror 6d is located in front of the tip portion of the bare portion 5a of the optical fiber 5. When the movable mirrors 7a, 7b are seen from the thickness direction of the substrate 1, the movable mirrors 7a, 7b are opposed to the optical fibers 3, 4 when the movable portion 9 is in the illustrated state (in a stopping position), and the movable mirrors 7a, 7b are located in positions unopposed to the optical fibers 3, 4 when the movable portion 9 is moved upward or downward. The tip portions of the bare portions 2a to 5a of the optical fibers 2 to 5 are arranged in the non-equal intervals, but all of these optical axes are parallel to each other. All of the fixing mirrors 6a to 6d and the movable mirrors 7a, 7b take postures inclined 45 degrees with respect to these optical axes.

In this embodiment mode, the same dummy stage portion 9c, movable mirrors 7a, 7b and fixing mirrors 6a to 6d as the above-mentioned case are also arranged on the side of the movable portion 9 opposed to the optical fibers 2 to 5. Thus, the movable portion 9 has a perfect symmetrical shape so that no unnecessary movement such as torsion, etc. is caused at the moving time. Thus, the relative angle and the relative position of each of the movable mirrors 7a, 7b with respect to the light beam are exactly held.

The optical fibers 2 to 5 of this embodiment mode are fiber collimators having a graded index type optical fiber, and their end faces are inclined about 3 to 8 degrees by cleaving or polishing and antireflection coatings are formed on these end faces to reduce return loss. The respective optical fibers 2 to 5 are arranged such that the tip portions of the bare portions 2a to 5a are approximately arranged in a straight line disposed substantially perpendicular to the optical axis of each of the optical fibers. A SELFOC lens and an aspheric lenses showing similar lens effects may be also used instead of the grade index type optical fiber. When the SELFOC lens and the aspherical lens are used, it is also desirable to reduce the reflection loss by forming the anti-reflection coating.

The driving means arranged above or below the substrate 1 is constructed by an electromagnet or an electrostatic actuator for applying attractive force or repulsive force to the movable portion 9. However, this driving means has a conventional well-known construction. Therefore, the illustration and the explanation of the driving means are omitted here. When the electromagnet is used as the driving means, an unillustrated magnetic material is arranged in the movable portion 9. When the electrostatic actuator is used as the driving means, the movable portion 9 is inserted between a pair of unillustrated electrodes.

In the optical switch having such a construction, in the state shown in FIG. 1, no beam portion 9b of the movable portion 9 is deformed and the movable mirrors 7a, 7b on the plane portion 9a are located so as to be opposed to the optical fibers 3, 4. Accordingly, for example, as shown by the: solid line in FIG. 2, the beam emitted from the optical fiber 2 is reflected on the fixing mirror 6a and is further reflected on the movable mirror 7a and is incident to the optical fiber 3. The beam emitted from the optical fiber 4 is reflected on the movable mirror 7b and is further reflected on the fixing mirror 6d and is incident to the optical fiber 5. Thus, an optical path from the optical fiber 2 to the optical fiber 3 and an optical path from the optical fiber 4 to the optical fiber 5 are formed.

In contrast to this, when the driving means is operated and the attractive force or the repulsive force is applied to the movable portion 9, the beam portion 9b having the spring property is flexed and deformed so that the plane portion 9a and the stage portion 9c are moved to above or below the substrate 1. Thus, the movable mirrors 7a, 7b on the stage portion 9c are moved to positions unopposed to the tip portions of the optical fibers 2 to 5. Namely, since the movable mirrors 7a, 7b are retreated from the optical paths of the optical fibers 2 to 5, for example, the beam emitted from the optical fiber 2 is reflected on the fixing mirror 6a and is further reflected on the fixing mirror 6d and is incident to the optical fiber 5 as shown by the one-dotted chain line in FIG. 2. Since no movable mirrors 7a, 7b exist on the optical paths, the beam emitted from the optical fiber 4 is reflected on the fixing mirror 6c and is further reflected on the fixing mirror 6b and is incident to the optical fiber 3. Thus, an optical path from the optical fiber 2 to the optical fiber 5 and an optical path from the optical fiber 4 to the optical fiber 3 are formed.

The optical path lengths in this case will be explained. First, in a state in which the movable portion 9 is located in the illustrated position (before the switching), the optical path from the optical fiber 2 to the optical fiber 3 through the fixing mirror 6a and the movable mirror 7a is formed and its optical path length (the distance between the tip portions of the bare portions of the optical fibers) is E+A+E=A+2E as shown in FIG. 2. The optical path from the optical fiber 4 to the optical fiber 5 through the movable mirror 7b and the fixing mirror 6d is also formed and its optical path length is E+C+E=C+2E. In contrast to this, in the moving state of the movable portion 9, the optical path from the optical fiber 2 to the optical fiber 5 through the fixing mirror 6a and the fixing mirror 6d is formed and its optical path length is E+A+B+C+E=A+B+C+2E. The optical path from the optical fiber 4 to the optical fiber 3 through the fixing mirror 6c and the fixing mirror 6b is also formed and it's optical path length is E+D+B+D+E=B+2D+2E. Here, three optical path lengths among the considered four optical paths are equal to each other by setting the relative position relation of the respective optical fibers 2 to 5, the fixing mirrors 6a to 6d and the movable mirrors 7a, 7b to A=C=B+2D. Accordingly, with respect to all of these three optical paths, light is also transmitted between the optical fibers in an optimum condition when the optical fibers 2 to 5 are fiber collimators.

In an optical means of an optical communication system called an add-drop system, the optical path is generally constructed by combining the four optical fibers of "IN", "OUT", "ADD" and "DROP". In particular, the optical path of "IN"-"OUT", the optical path of "ADD"-"OUT" and the optical path of "IN"-"DROP" before and after the switching are important. It is desirable to preferably transmit light in these optical paths with reduced loss as much as possible. Therefore, the optical fibers are arranged such that at least these optical path lengths, concretely, the distances between the end portions of the optical fibers are conformed to each other and become optimum distances according to the characteristics of the fiber collimators. However, since the optical path of "ADD"-"DROP" is normally not necessary so much in the optical communication of the add-drop system, no optical path length is particularly limited. Accordingly, in the construction shown in FIG. 2, if the optical fibers 2 to 5 are set to e.g., the order of "ADD", "OUT", "IN" and "DROP", the optical path length (B+2D+2E) of the optical path "IN"-"OUT", the optical path length (A+2E) of the optical path "ADD"-"OUT", and the optical path length (C+2E) of the optical path "IN"-"DROP" can be set to be equal to each other, and only the optical path length (A+B+C+2E) of the optical path "ADD"-"DROP" can be set to be different from these three optical path lengths. In accordance with such a construction, sufficient effects are obtained although the optical path lengths of all the optical paths are not the same. The combination of "ADD", "OUT", "IN" and "DROP" is not limited to the above case, but can be freely set if the incident and emitting relation of light is appropriate and the combination is set such that all the optical path lengths of the three optical paths except for "ADD"-"DROP" are equal to each other.

In this embodiment mode, for example, the optical fiber 2 is a fourth optical fiber, and one of the optical fibers 3, 5 is a second optical fiber and the other is a third optical fiber, and the optical fiber 4 is a first optical fiber. In this case, the fixing mirrors 6b and 6c constitute a fixing mirror means, and the fixing mirrors 6a and 6d constitute another fixing mirror means, and the movable mirror 7b constitutes a movable mirror means, and the movable mirror 7a constitutes another movable mirror means.

Table 3 shows a concrete design example in the construction of this embodiment mode.

TABLE 3

Design example of first embodiment mode
(In general, A, C = 125 to 500 μm, B = 125 to 250 μm, and D, E = 0 to 250 μm are set.)

| | |
|---|---|
| A | 400 |
| B | 150 |
| C | 400 |
| D | 125 |
| E | 100 |
| optical fiber 2→3 A + 2E 600 | |
| optical fiber 4→5 C + 2E 600 | |
| optical fiber 2→5 A + B + C + 2E 1150 | |
| optical fiber 4→3 B + 2D + 2E 600 | |

TABLE 3-continued

Design example of first embodiment mode
(In general, A, C = 125 to 500 μm, B = 125 to 250 μm, and D, E = 0 to 250 μm are set.)

| | |
|---|---|
| A | 350 |
| B | 150 |
| C | 350 |
| D | 100 |
| E | 100 |
| optical fiber 2→3 A + 2E 550 | |
| optical fiber 4→5 C + 2E 550 | |
| optical fiber 2→5 A + B + C + 2E 1050 | |
| optical fiber 4→3 B + 2D + 2E 550 | |
| A | 350 |
| B | 150 |
| C | 350 |
| D | 100 |
| E | 75 |
| optical fiber 2→3 A + 2E 500 | |
| optical fiber 4→5 C + 2E 500 | |
| optical fiber 2→5 A + B + C + 2E 1000 | |
| optical fiber 4→3 B + 2D + 2E 500 | |
| A | 300 |
| B | 150 |
| C | 300 |
| D | 75 |
| E | 100 |
| optical fiber 2→3 A + 2E 500 | |
| optical fiber 4→5 C + 2E 500 | |
| optical fiber 2→5 A + B + C + 2E 950 | |
| optical fiber 4→3 B + 2D + 2E 500 | |
| A | 250 |
| B | 150 |
| C | 250 |
| D | 50 |
| E | 100 |
| optical fiber 2→ A + 2E 450 | |
| optical fiber 4→5 C + 2E 450 | |
| optical fiber 2→5 A + B + C + 2E 850 | |
| optical fiber 4→3 B + 2D + 2E 450 | |
| A | 200 |
| B | 150 |
| C | 200 |
| D | 25 |
| E | 100 |
| optical fiber 2→3 A + 2E 400 | |
| optical fiber 4→5 C + 2E 400 | |
| optical fiber 2→5 A+ B + C + 2E 750 | |
| optical fiber 4→3 B + 2D + 2E 400 | |

As mentioned above, the optical path lengths of the three optical paths ("IN"-"OUT", "ADD"-"OUT" and "IN"-"DROP" in the case of the add-drop system) can be set to be equal to each other by setting A=C=B+2D. In reality, for example, a suitable size is selected in consideration of the characteristics of the fiber collimator as shown in Tables 1 and 2, the diameter of the fiber (diameter 125 μm is set in the design example of Table 3), the size of each mirror, etc.

In this embodiment mode, the optical switch is not constructed such that plural beams are simultaneously reflected on one mirror, but is constructed such that only one beam is reflected on one mirror. Therefore, each mirror can be made compact and the mirror arranging area can be reduced so that the tip portions of the bare portions 2a to 5a of the optical fibers 2 to 5 are arranged so as to be closer to each other and the optical path length can be shortened. The allowance ranges with respect to the shifts of the positions and the angles of the optical fibers 2 to 5 and each of the mirrors 6a to 6d, 7a, 7b are increased by shortening the optical path length.

Further, the movable mirrors 7a, 7b are preferably set to three times or less the beam diameter and are more preferably set to about 1.5 times the beam diameter, and are therefore compact. Therefore, the entire movable portion can be made compact and light in weight and the output of the driving means such as an electromagnet, etc. can be reduced and restrained. Further, switching speed-can be increased by raising resonance frequency so as to make high speed optical communication. Further, the entire optical switch is made compact and the number of optical switches able to be manufactured from one wafer is increased so that manufacture cost can be reduced.

The manufacturing method of this optical switch device will be briefly explained. First, a substrate 1 constructed by silicon is patterned and etched so that a concave portion 1a and a movable portion 9 (plane portion 9a, beam portion 9b and stage portion 9c) located within this concave portion 1a are formed. Simultaneously, fixing mirrors 6a to 6d on the substrate 1, movable mirrors 7a, 7b on the stage portion 9c of the movable portion 9, and guide members 12a, 12b having guide grooves 8a, 8b are formed. Gold or aluminum is evaporated on the surface of each of the mirrors 6a to 6d, 7a, 7b to improve reflectivity with respect to the wavelength of used light. Further, the optical fibers 2 to 5 are inserted into the guide grooves 8a, 8b of the guide members 12a, 12b and are positioned and are fixed by using a UV adhesive, etc. Each of the optical fibers 2 to 5 is arranged by the guide grooves 8a, 8b so as to satisfy the above relative position relation. Thereafter, the driving means such as an electromagnet, etc. is arranged and the optical switch device is completed although this arrangement is unillustrated.

Figure 3:
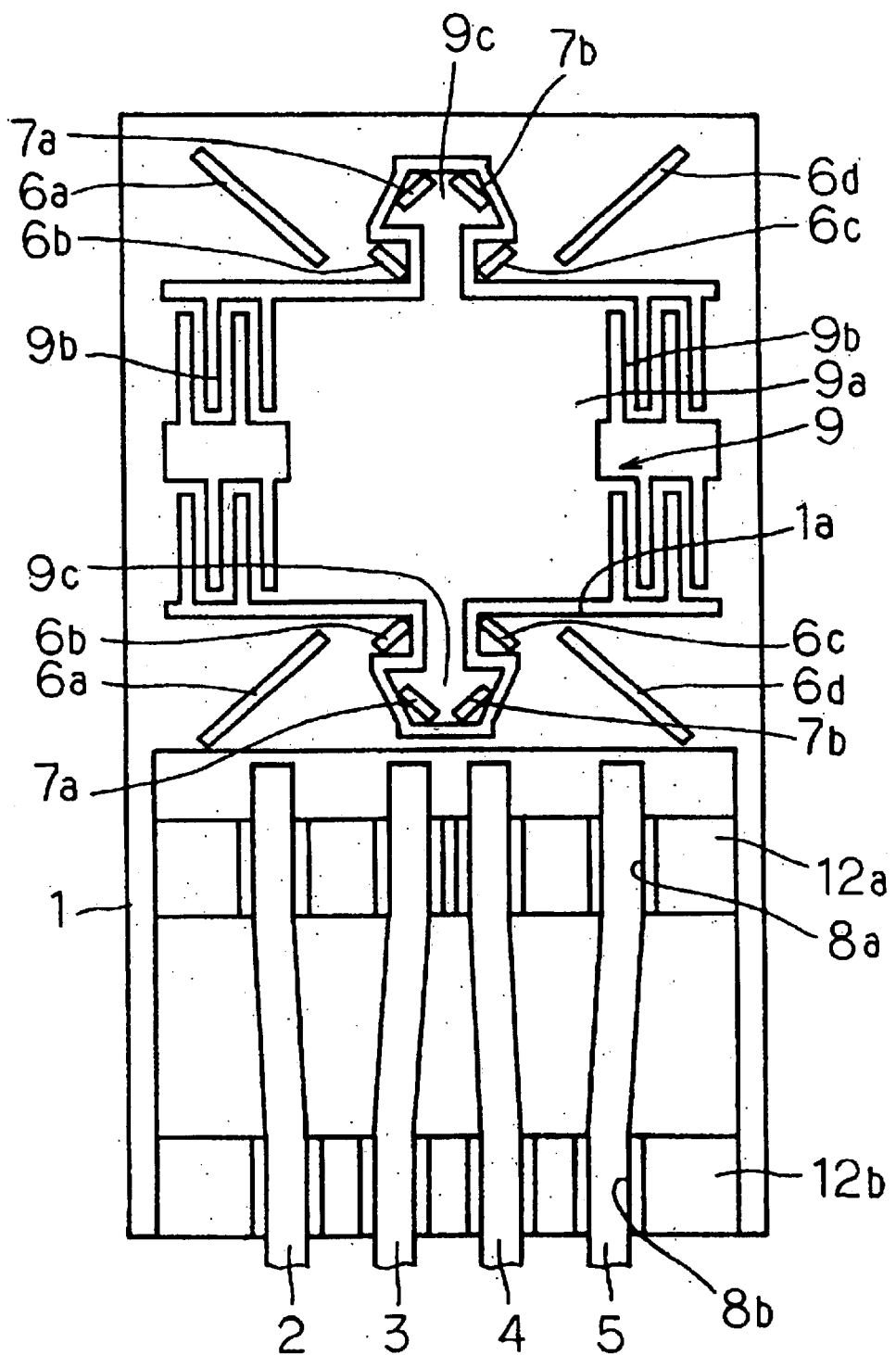
FIG. 3 is a plan view showing a modified example of the first embodiment mode of the optical switch of the present invention.

FIG. 3 shows a modified example of this embodiment mode. In this example, the optical fibers 2 to 5 are not covered at all, and are arranged in parallel with each other at an equal interval in a portion supported by the guide member 12b. The optical fibers 2 to 5 are bent between the guide member 12b and the guide member 12a so as to form the above position relation.

Figure 4:
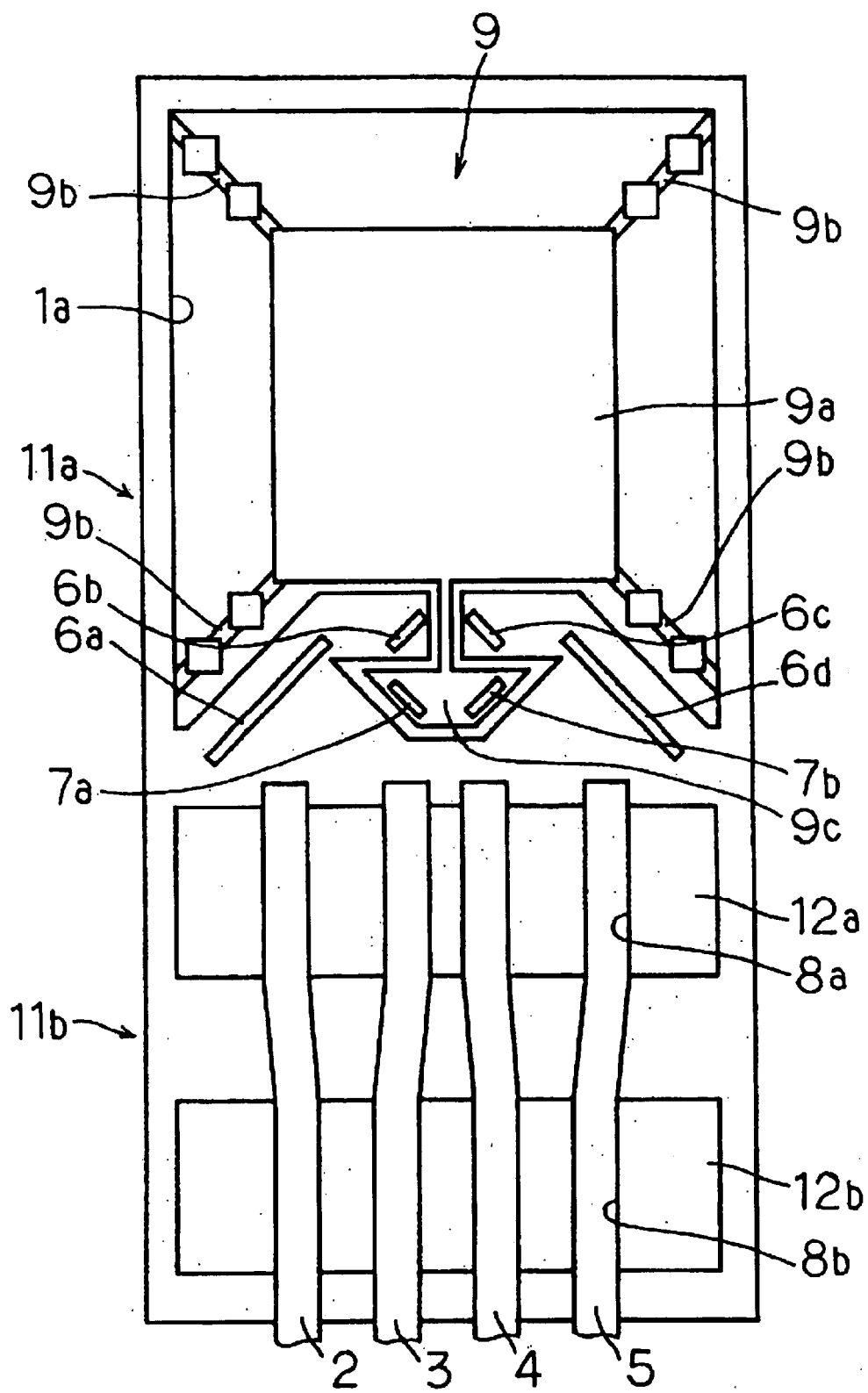
FIG. 4 is a plan view showing another modified example of the first embodiment mode of the optical switch of the present invention.
Figure 5:
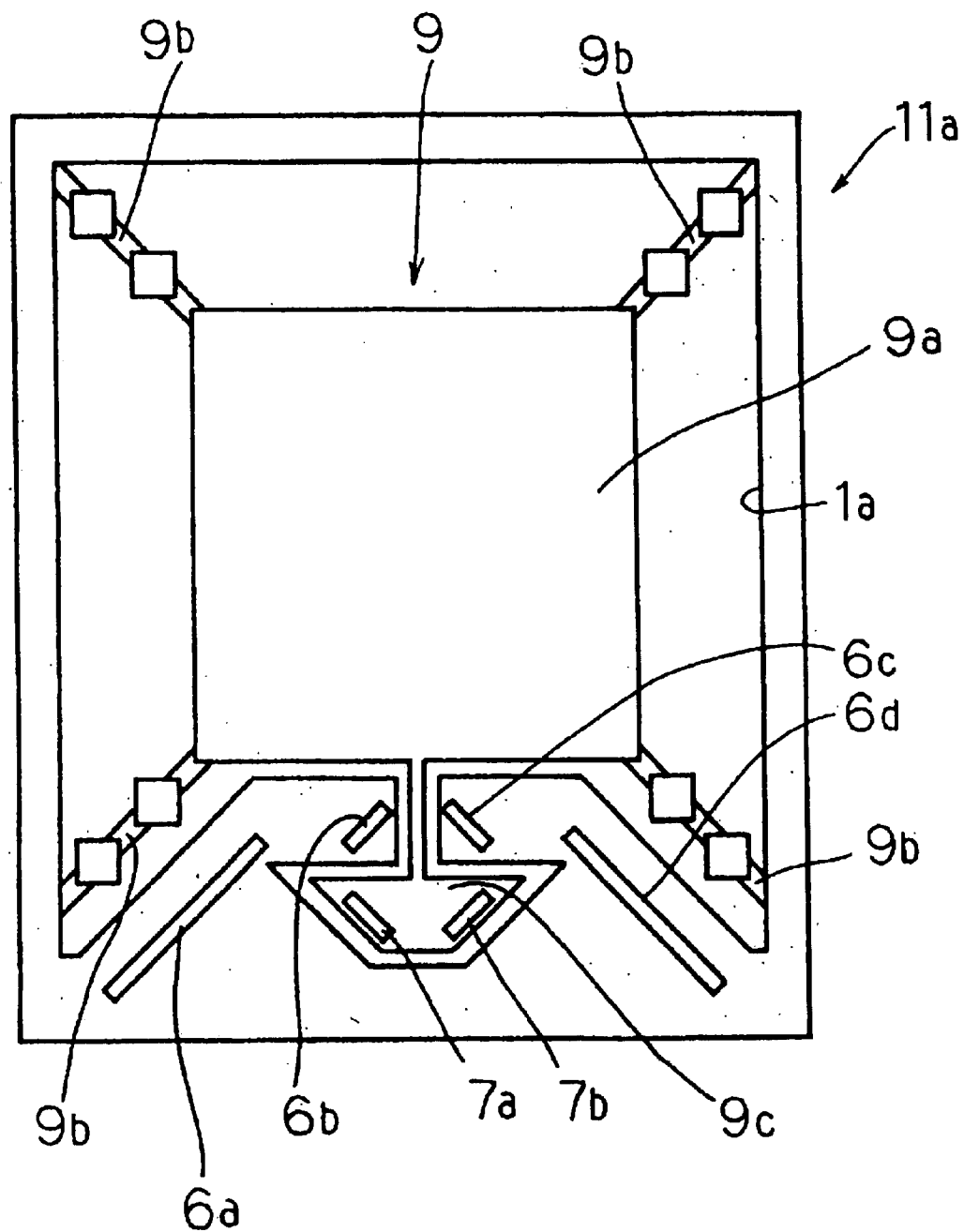
FIG. 5 is an enlarged view of a mirror structural portion of the optical switch shown in FIG. 4.
Figure 6:
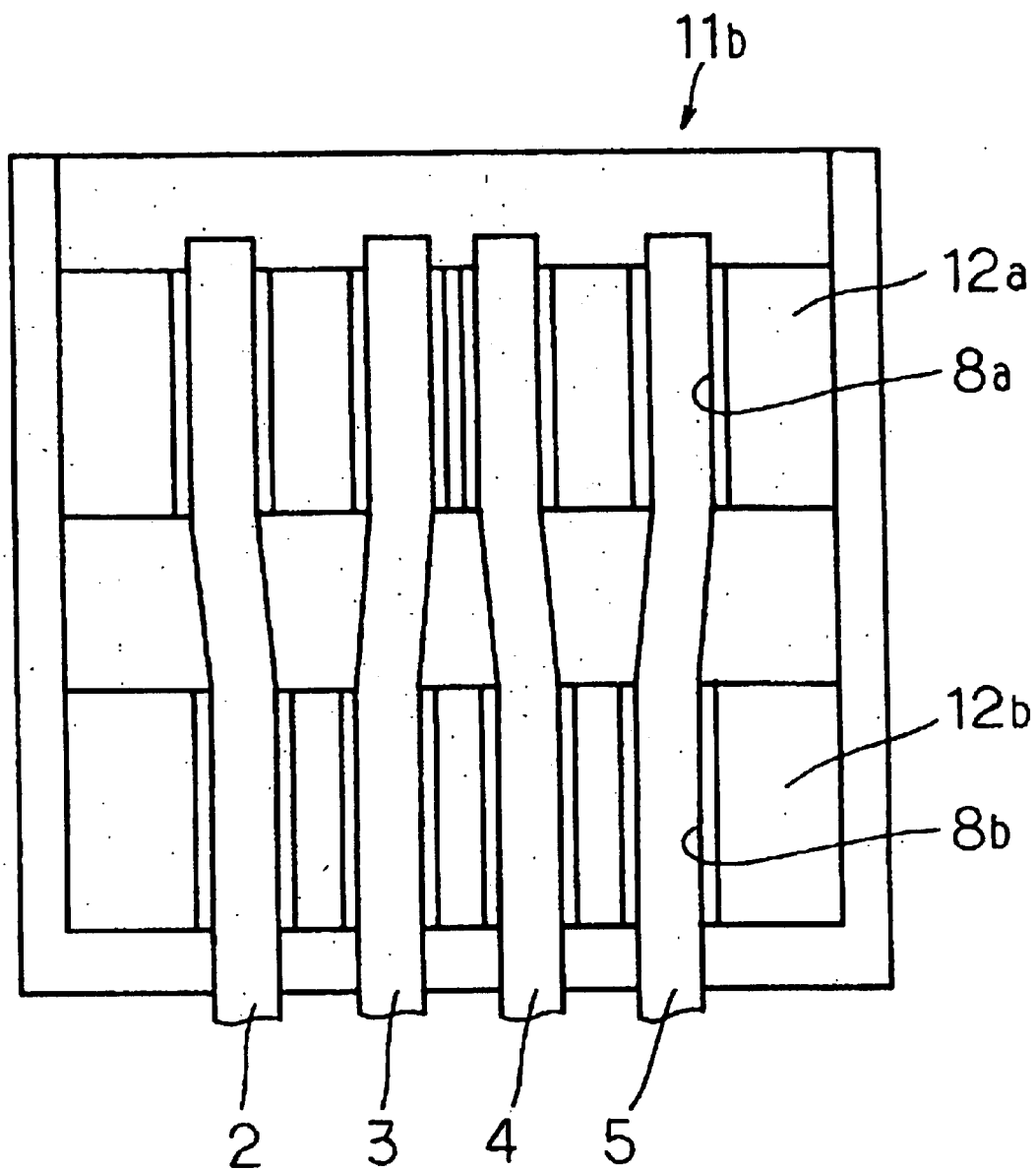
FIG. 6 is an enlarged view of a collimator structural portion of the optical switch shown in FIG. 4.

FIG. 4 shows still another modified example of this embodiment mode. In this example, dummy stage portion 9c, movable mirrors 7a, 7b and fixing mirrors 6a to 6d are not arranged, and a plane portion 9a is in a state in which this plane portion 9a is suspended by four beam portions 9b from four directions. In this construction, the movable portion 9 is further made compact and light in weight. Further, this optical switch is constructed such that a mirror structural portion 11a shown in FIG. 5 and a collimator structural portion 11b shown in FIG. 6 are separately formed and joined. In accordance with this construction, the manufacture process is simplified and the relative position aligning adjustment of each mirror and the optical fiber is relatively easily made.

Figure 7:
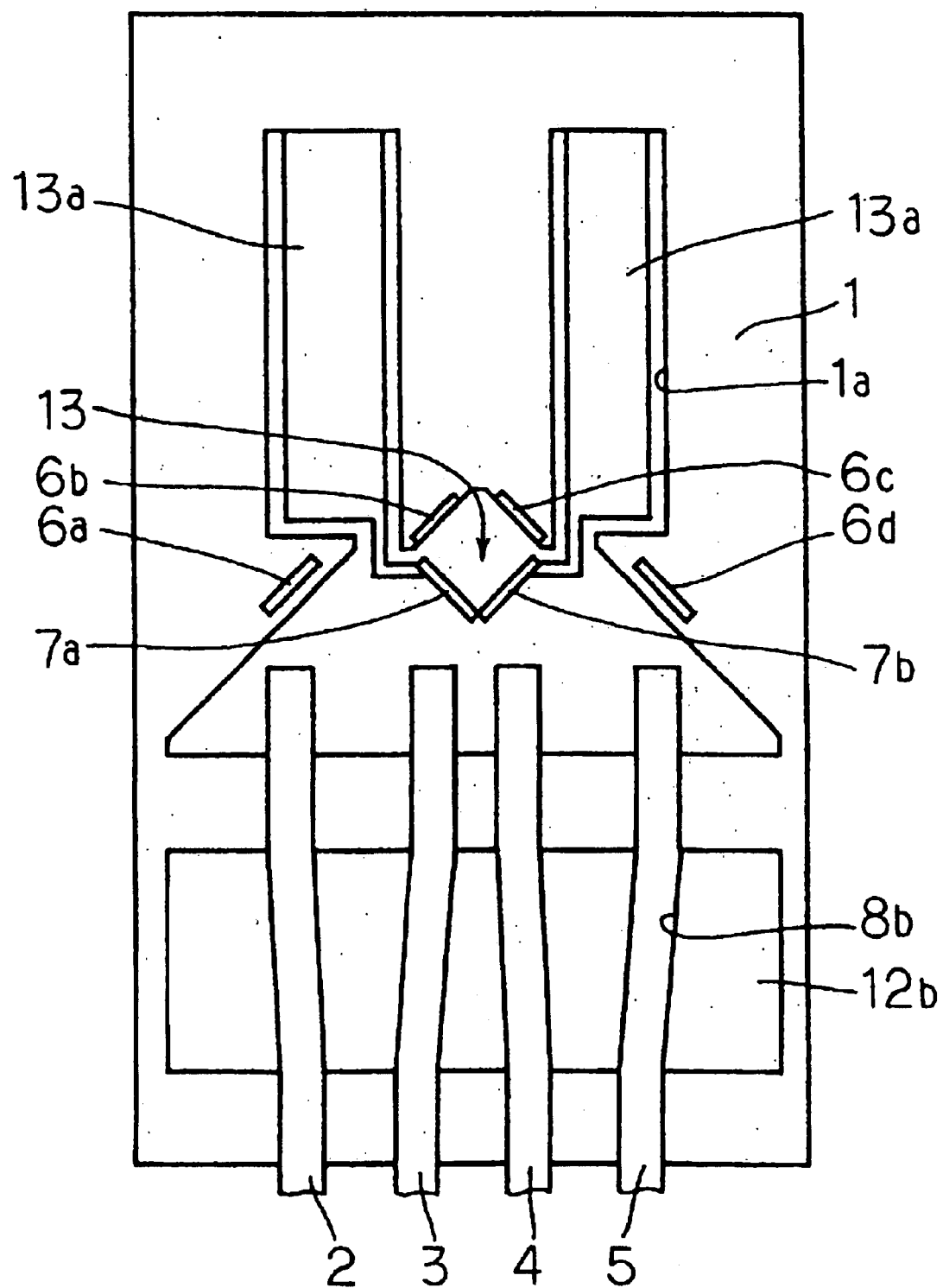
FIG. 7 is a plan view showing still another modified example of the first embodiment mode of the optical switch of the present invention.

FIG. 7 shows still another modified example of this embodiment mode. A movable portion 13 of this example is constructed by two movable plates 13a of a cantilever shape located within a concave portion 1a, and movable mirrors 7a, 7b are held by these two movable plates 13a. Thus, no mode of the movable portion of the present invention is particularly limited.

A variable optical attenuator (VOA) can be constructed by controlling the position of the movable mirror 7b with high accuracy without arranging the movable mirror 7a, i.e., by controlling the advancing amount and the retreating amount of the movable mirror 7b with respect to the optical path with high accuracy. For example, when the movable mirror 7b is advanced into the optical path until the half of a beam size, the half of light from the "IN" port is reflected on the movable mirror 7b and is propagated to the "DROP" port and the remaining half light is propagated to the "OUT" port without being obstructed by the movable mirror 7b. Namely, the signal light from the "IN" port can be divided into the half lights of the "OUT" port and the "DROP" port and can be propagated. Further, for example, when the movable mirror 7b is advanced into the optical path until 70 percent of the beam size, 70 percent of light is reflected on the movable mirror 7b and is propagated to the "DROP" port and the remaining 30 percent of light is propagated to the "OUT" port without being obstructed by the movable mirror 7b. Accordingly, the light amount propagated to each port can be controlled by controlling the position of the movable mirror 7b, i.e., the advancing amount and the retreating amount of the movable mirror 7b with respect to the optical path with high accuracy. The position of the movable mirror 7b can be controlled with high accuracy by using an electromagnetic actuator and an electrostatic actuator. When the electromagnetic actuator is used, the position of the movable mirror can be controlled with high accuracy by controlling the electric current flowed to the electromagnetic actuator. When the electrostatic actuator is used, the position of the movable mirror can be controlled with high accuracy by controlling the voltage applied to the electrostatic actuator. Further, the variable optical attenuator (VOA) can be similarly constructed by arranging the movable mirror 7a without arranging the movable mirror 7b, and controlling the advancing amount and the retreating amount of the movable mirror 7a with respect to the optical path with high accuracy.

The optical switch device of an array shape can be constructed by arranging and using plural optical switches S of the above construction in the present invention in parallel with each other within a plane in which the optical fibers are aligned with each other. As concrete examples of this construction, the plural optical switches S are arranged in a line as shown in FIG. 17A, and the plural optical switches S are arranged in a zigzag shape so as to be made compact in the width direction (the vertical direction of FIG. 17) as shown in FIG. 17B, etc. Further, as shown in FIG. 17C, substantially similar to FIG. 17A, it is also possible to form an optical switch device constructed such that the plural optical switches S are arranged in parallel with each other, but are integrated by commonizing members such as the substrate 1, etc. Namely, the compacter optical switch device of an array shape can be manufactured at low cost by arranging and manufacturing portions of the fixing mirror, the movable mirror, etc. in parallel with each other within the same wafer. In this case, the optical switch device is very simply manufactured and treated. In these optical switch devices, each optical switch S is arranged such that the optical axes of the respective optical fibers are substantially parallel to each other.

When the optical switch device of an array shape is constructed in this way, it is necessary to set a construction in which no driving force such as magnetic force, electrostatic force, etc. for moving the movable mirror affects the adjacent optical switch S. When the electrostatic force is used, the action range is about 10 μm and is therefore small so that the optical switches S are easily set to approach each other. When the magnetic force is used, the action range is about several hundred μm. Therefore, it is necessary to use a structure such as a magnetic shield, etc. for interrupting the magnetism so as not to affect the adjacent optical switch.

[Second Embodiment Mode]

A second embodiment mode of the optical switch of the present invention shown in FIG. 8 will next be explained. In this embodiment mode, only the arrangement of the optical fiber and each mirror differs from that in the first embodiment mode, and the other constructions and the manufacturing method are substantially the same as the first embodiment mode. Therefore, their explanations are omitted.

In this embodiment mode, four fixing mirrors 14a to 14d are respectively arranged in front of the tip portions of respective optical fibers 2 to 5. A movable mirror 15a is arranged between the fixing mirror 14a and the optical fiber 2. A movable mirror 15b is arranged between the fixing mirror 14c and the optical fiber 4. In this embodiment mode, the optical fibers 2 to 5 are divided into a set of optical fibers 2 and 5 and a set of optical fibers 3 and 4. One (e.g., optical fibers 2 and 5) of the sets is set to emitting side optical fibers, and the other set (e.g., optical fibers 3 and 4) is set to incident side optical fibers.

Figure 8:
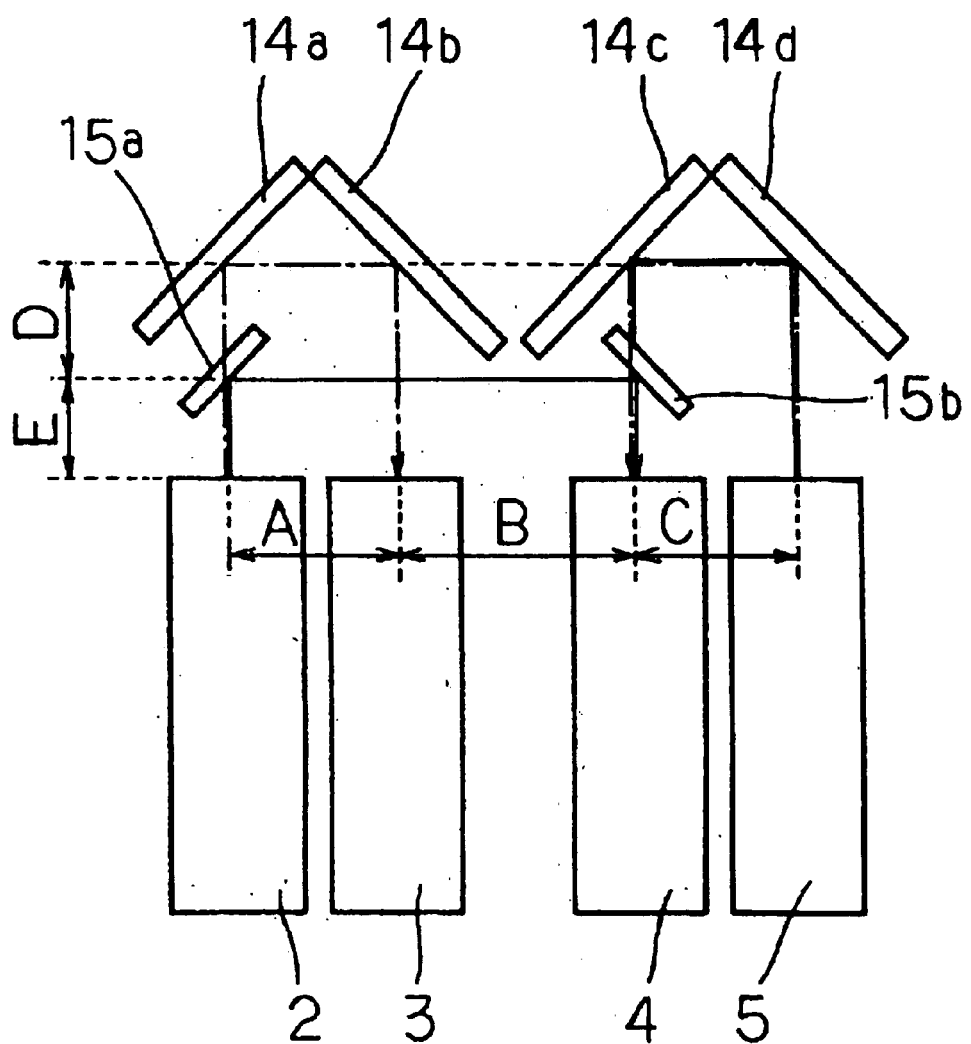
FIG. 8 is a typical view of a main portion of a second embodiment mode of the optical switch of the present invention.

In this optical switch, in the state shown in FIG. 8, for example, as shown by the solid line, the beam emitted from the optical fiber 2 is reflected on the movable mirror 15a and is further reflected on the movable mirror 15b and is incident to the optical fiber 4. The beam emitted from the optical fiber 5 is reflected on the fixing mirrors 14d and 14c, but is interrupted on the rear face of the movable mirror 15b and does not reach the other optical fibers. Finally, only an optical path from the optical fiber 2 to the optical fiber 4 is formed. When the unillustrated driving means moves the movable portion, the movable mirrors 15a, 15b are moved to positions unopposed to the tip portions of the optical fibers 2 to 5. Therefore, for example, as shown by the one-dotted chain line, the beam emitted from the optical fiber 2 is reflected on the fixing mirror 14a and is further reflected on the fixing mirror 14b and is incident to the optical fiber 3. The beam emitted from the optical fiber 5 is reflected on the fixing mirror 14d and is further reflected on the fixing mirror 14c and is incident to the optical fiber 4. Thus, an optical path from the optical fiber 2 to the optical fiber 3 and an optical path from the optical fiber 5 to the optical fiber 4 are formed.

The optical path length of the optical path from the optical fiber 2 to the optical fiber 4 in the illustrated state is $E+A+B+E=A+B+2E$. At the moving time of the movable mirrors 15a, 15b, the optical path length of the optical path from the optical fiber 2 to the optical fiber 3 is $E+D+A+D+E=A+2D+2E$, and the optical path length of the optical path from the optical fiber 5 to the optical fiber 4 is $E+D+C+D+E=C+2D+2E$. Accordingly, the optical path lengths of the three optical paths are equal to each other by setting the relative position relation of the respective optical fibers 2 to 5, the fixing mirrors 14a to 14d and the movable mirrors 15a, 15b to $A=C$ and $B=2D$. In the case of the add-drop system, for example, if the optical fibers 2 to 5 are set to the order of "IN", "DROP", "OUT" and "ADD", the optical path "ADD"-"DROP" not necessarily required is omitted, and the optical path lengths of the other three optical paths "IN"-"OUT", "ADD"-"OUT" and "IN"-"DROP" can be set to be equal to each other. Table 4 shows its concrete design example.

TABLE 4

Design example of second embodiment mode
(In general, A, B, C = 125 to 500 μm, and D, E = 0 to 250 μm are set.)

| | |
|---|---|
| A | 300 |
| B | 250 |
| C | 300 |
| D | 125 |
| E | 100 |
| optical fiber 2→3 A + 2D + 2E | 750 |

TABLE 4-continued

Design example of second embodiment mode
(In general, A, B, C = 125 to 500 μm, and D, E = 0 to 250 μm are set.)

optical fiber 5→4 C + 2D + 2E 750
optical fiber 2→4 A + B + 2E 750
optical fiber 5→3
nonexistence

| | |
|---|---|
| A | 250 |
| B | 250 |
| C | 250 |
| D | 125 |
| E | 100 | optical fiber 2→3 A + 2D + 2E 700
optical fiber 5→4 C + 2D + 2E 700
optical fiber 2→4 A + B + 2E 700
optical fiber 5→3
nonexistence

| | |
|---|---|
| A | 250 |
| B | 250 |
| C | 250 |
| D | 125 |
| E | 50 | optical fiber 2→3 A + 2D + 2E 600
optical fiber 5→4 C + 2D + 2E 600
optical fiber 2→4 A + B + 2E 600
optical fiber 5→3
nonexistence

| | |
|---|---|
| A | 200 |
| B | 150 |
| C | 200 |
| D | 75 |
| E | 100 | optical fiber 2→3 A + 2D + 2E 550
optical fiber 5→4 C + 2D + 2E 550
optical fiber 2→4 A + B + 2E 550
optical fiber 5→3
nonexistence

| | |
|---|---|
| A | 200 |
| B | 200 |
| C | 200 |
| D | 100 |
| E | 50 | optical fiber 2→3 A + 2D + 2E 500
optical fiber 5→4 C + 2D + 2E 500
optical fiber 2→4 A + B + 2E 500
optical fiber 5→3
nonexistence

| | |
|---|---|
| A | 150 |
| B | 150 |
| C | 150 |
| D | 75 |
| E | 50 | optical fiber 2→3 A + 2D + 2E 400
optical fiber 5→4 C + 2D + 2E 400
optical fiber 2→4 A + B + 2E 400
optical fiber 5→3
nonexistence In accordance with this Table 4, the same effects as the first embodiment mode are substantially obtained.

In this embodiment mode, for example, the optical fiber 2 is a first optical fiber, and one of the optical fibers 3, 4 is a second optical fiber, and the other is a third optical fiber, and the optical fiber 5 is a fourth optical fiber. In this case, the fixing mirrors 14a and 14b constitute a fixing mirror means, and the fixing mirrors 14c and 14d constitute another fixing mirror means, and the movable mirrors 15a and 15b constitute a movable mirror means.

[Third Embodiment Mode]

A third embodiment mode of the optical switch of the present invention shown in FIG. 9 will next be explained. This embodiment mode differs from the first embodiment mode only in the arrangement of the optical fiber and each mirror, and the other constructions and the manufacturing method are substantially the same as the first embodiment mode. Accordingly, their explanations are omitted.

In this embodiment mode, four fixing mirrors 16a to 16d are respectively arranged in front of the tip portions of respective optical fibers 2 to 5, and movable mirrors 17a to 17d are respectively arranged between the respective fixing mirrors 16a to 16d and the respective optical fibers 2 to 5. In this embodiment mode, the optical fibers 2 to 5 are divided into a set of optical fibers 2 and 5 and a set of optical fibers 3 and 4, and one (e.g., optical fibers 2 and 5) of the sets is set to emitting side optical fibers, and the other set (e.g., optical fibers 3 and 4) is set to incident side optical fibers.

Figure 9:
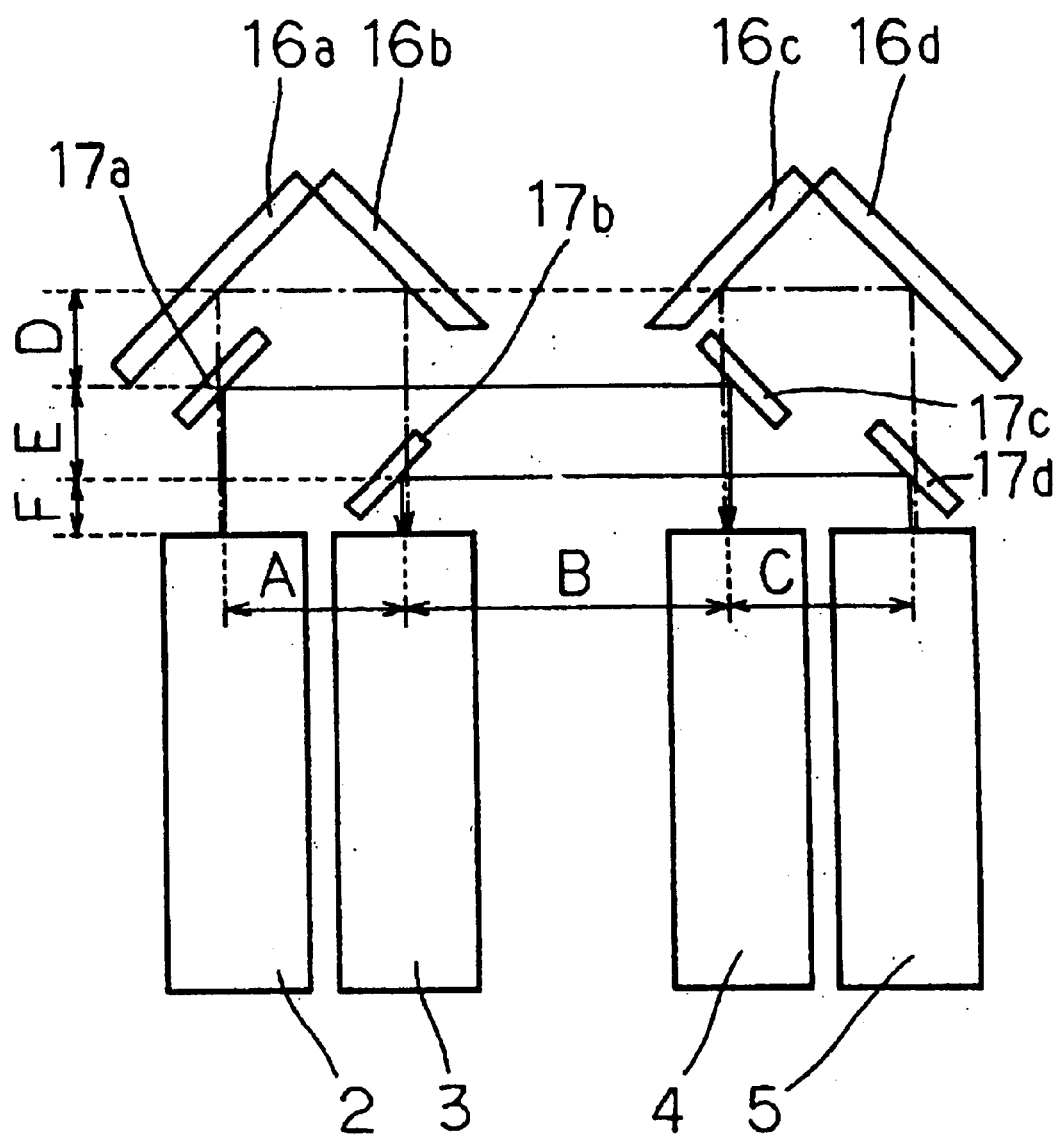
FIG. 9 is a typical view of a main portion of a third embodiment mode of the optical switch of the present invention.

In this optical switch, in the state shown in FIG. 9, for example, as shown by the solid line, the beam emitted from the optical fiber 2 is reflected on the movable mirror 17a and is further reflected on the movable mirror 17c and is incident to the optical fiber 4. The beam emitted from the optical fiber 5 is reflected on the movable mirror 17d and is further reflected on the movable mirror 17b and is incident to the optical fiber 3. Thus, an optical path from the optical fiber 2 to the optical fiber 4 and an optical path from the optical fiber 5 to the optical fiber 3 are formed. When the unillustrated driving means moves the movable portion, the movable mirrors 17a to 17d are moved to positions unopposed to the tip portions of the optical fibers 2 to 5. Therefore, for example, as shown by the one-dotted chain line, the beam emitted from the optical fiber 2 is reflected on the fixing mirror 16a and is further reflected on the fixing mirror 16b and is incident to the optical fiber 3. The beam emitted from the optical fiber 5 is reflected on the fixing mirror 16d and is further reflected on the fixing mirror 16c and is incident to the optical fiber 4. Thus, an optical path from the optical fiber 2 to the optical fiber 3 and an optical path from the optical fiber 5 to the optical fiber 4 are formed.

In the state shown in FIG. 9, the optical path length of the optical path from the optical fiber 2 to the optical fiber 4 is F+E+A+B+E+F=A+B+2E+2F. The optical path length of the optical path from the optical fiber 5 to the optical fiber 3 is F+C+B+F=B+C+2F. At the moving time of the movable mirrors 17a to 17d, the optical path length of the optical path from the optical fiber 2 to the optical fiber 3 is F+E+D+A+D+E+F=A+2D+2E+2F, and the optical path length of the optical path from the optical fiber 5 to the optical fiber 4 is F+E+D+C+D+E+F=C+2D+2E+2F. Accordingly, the three optical path lengths among the considered four optical paths are equal to each other by setting the relative position relation of the respective optical fibers 2 to 5, the fixing mirrors 16a to 16d and the movable mirrors 17a to 17d to A=C and B=2D. In the case of the add-drop system, for example, if the optical fibers 2 to 5 are set to the order of "IN", "DROP", "OUT" and "ADD", the optical fibers 2 to 5 can be constructed such that the optical path lengths of the three optical paths "IN"-"OUT", "ADD"-"OUT" and "IN"-"DROP" are set to be equal to each other, and only the optical path length of the optical path "ADD"-"DROP" is slightly different from these three optical path lengths. Table 5 shows its concrete design example.

TABLE 5

Design example of third embodiment mode
(In general, A, B, C = 125 to 500 μm, and D, E, F = 0 to 250 μm are set.)

| | |
|---|---|
| A | 250 |
| B | 250 |
| C | 250 |

TABLE 5-continued

Design example of third embodiment mode
(In general, A, B, C = 125 to 500 μm, and D, E, F = 0 to 250 μm are set.)

|   |   |
|---|---|
| D | 125 |
| E | 50 |
| F | 50 |
| optical fiber 2→3 A + 2D + 2E + 2F 700 | |
| optical fiber 5→4 C + 2D + 2E + 2F 700 | |
| optical fiber 2→4 A + B + 2E + 2F 700 | |
| optical fiber 5→3 B + C + 2F 600 | |
| A | 250 |
| B | 200 |
| C | 250 |
| D | 100 |
| E | 50 |
| F | 50 |
| optical fiber 2→3 A + 2D + 2E + 2F 650 | |
| optical fiber 5→4 C + 2D + 2E + 2F 650 | |
| optical fiber 2→4 A + B + 2E + 2F 650 | |
| optical fiber 5→3 B + C + 2F 550 | |
| A | 250 |
| B | 150 |
| C | 250 |
| D | 75 |
| E | 50 |
| F | 50 |
| optical fiber 2→3 A + 2D + 2E + 2F 600 | |
| optical fiber 5→4 C + 2D + 2E + 2F 600 | |
| optical fiber 2→4 A + B + 2E + 2F 600 | |
| optical fiber 5→3 B + C + 2F 500 | |
| A | 200 |
| B | 150 |
| C | 200 |
| D | 75 |
| E | 50 |
| F | 50 |
| optical fiber 2→3 A + 2D + 2E + 2F 550 | |
| optical fiber 5→4 C + 2D + 2E + 2F 550 | |
| optical fiber 2→4 A + B + 2E + 2F 550 | |
| optical fiber 5→3 B + C + 2F 450 | |
| A | 150 |
| B | 150 |
| C | 150 |
| D | 75 |
| E | 50 |
| F | 50 |
| optical fiber 2→3 A + 2D + 2E + 2F 500 | |
| optical fiber 5→4 C + 2D + 2E + 2F 500 | |
| optical fiber 2→4 A + B + 2E + 2F 500 | |
| optical fiber 5→3 B + C + 2F 400 | |
| A | 150 |
| B | 150 |
| C | 150 |
| D | 75 |
| E | 50 |
| F | 25 |
| optical fiber 2→3 A + 2D + 2E + 2F 450 | |
| optical fiber 5→4 C + 2D + 2E + 2F 450 | |
| optical fiber 2→4 A + B + 2E + 2F 450 | |
| optical fiber 5→3 B + C + 2F 350 | |

In accordance with this Table 5, the number of movable mirrors is increased, but the only different optical path length of the optical path "ADD"-"DROP" can be also set to be very close to the optical path lengths of the other three optical paths. The same effects as the first embodiment mode can be substantially obtained except for this.

In this embodiment mode, for example, the optical fiber 2 is a first optical fiber, and one of the optical fibers 3, 4 is a second optical fiber, and the other is a third optical fiber, and the optical fiber 5 is a fourth optical fiber. In this case, the fixing mirrors 16a and 16b constitute a fixing mirror means, and the fixing mirrors 16c and 16d constitute another fixing mirror means, and the movable mirrors 17a and 17c constitute a movable mirror means, and the movable mirrors 17b and 17d constitute another movable mirror means.

[Fourth Embodiment Mode]

A fourth embodiment mode of the optical switch of the present invention shown in FIG. 10 will next be explained. In this embodiment mode, only the arrangement of the optical fiber and each mirror differs from that in the first embodiment mode, and the other constructions and the manufacturing method are substantially the same as the first embodiment mode. Accordingly, their explanations are omitted.

In this embodiment mode, four fixing mirrors 18a to 18d are respectively arranged in front of the tip portions of respective optical fibers 2 to 5, and movable mirrors 19a to 19d are respectively arranged between'the respective fixing mirrors 18a to 18d and the respective optical fibers 2 to 5. In this embodiment mode, the optical fibers 2 to 5 are divided into a set of optical fibers 2 and 4 and a set of optical fibers 3 and 5, and one (e.g., optical fibers 2 and 4) of the sets is set to emitting side optical fibers, and the other set (e.g., optical fibers 3 and 5) is set to incident side optical fibers.

Figure 10:
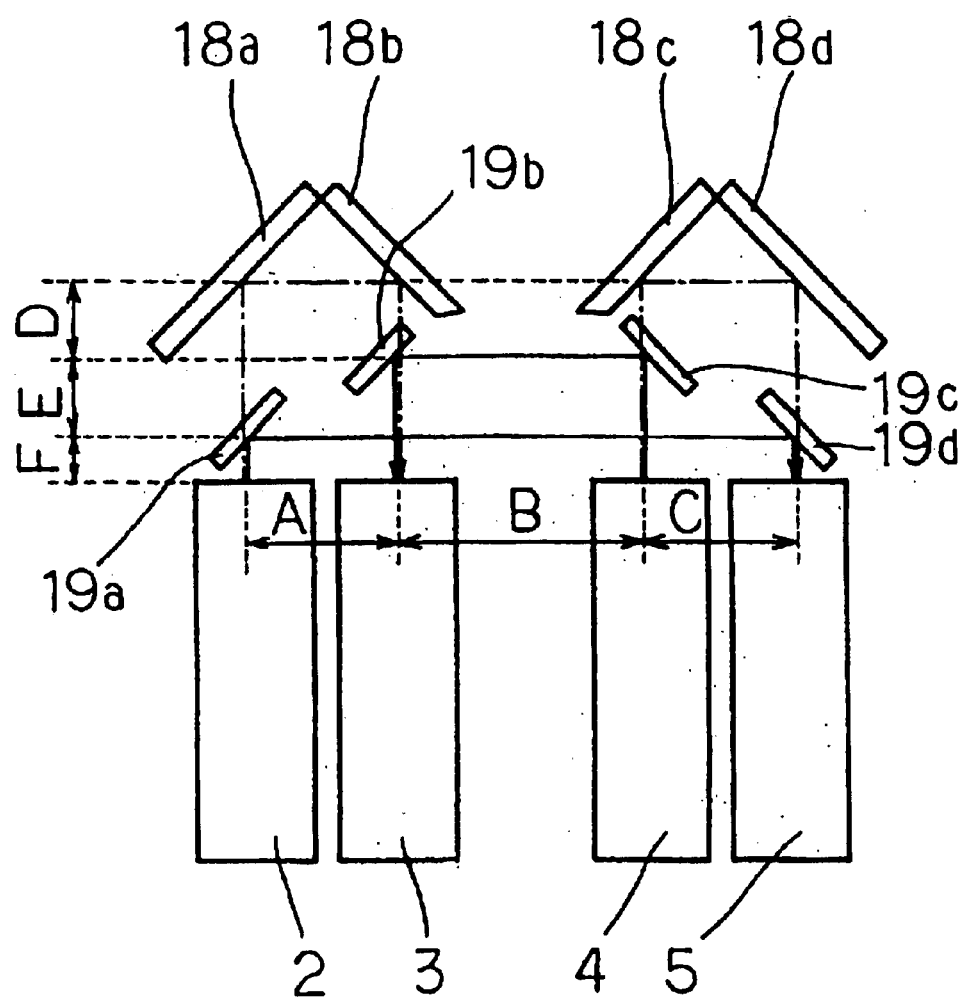
FIG. 10 is a typical view of a main portion of a fourth embodiment mode of the optical switch of the present invention.
Figure 11:
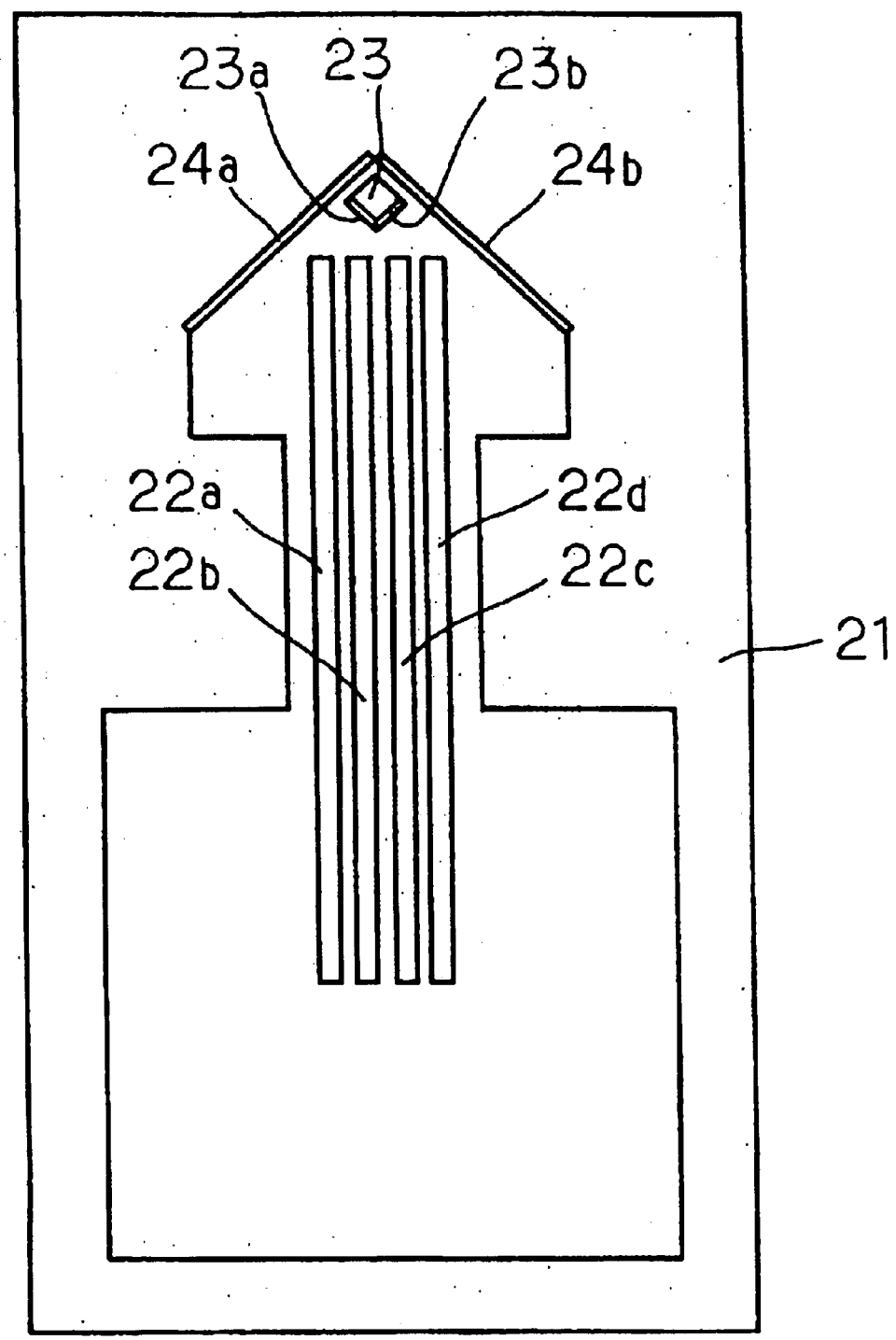
FIG. 11 is a plan view of a conventional optical switch.
Figure 12:
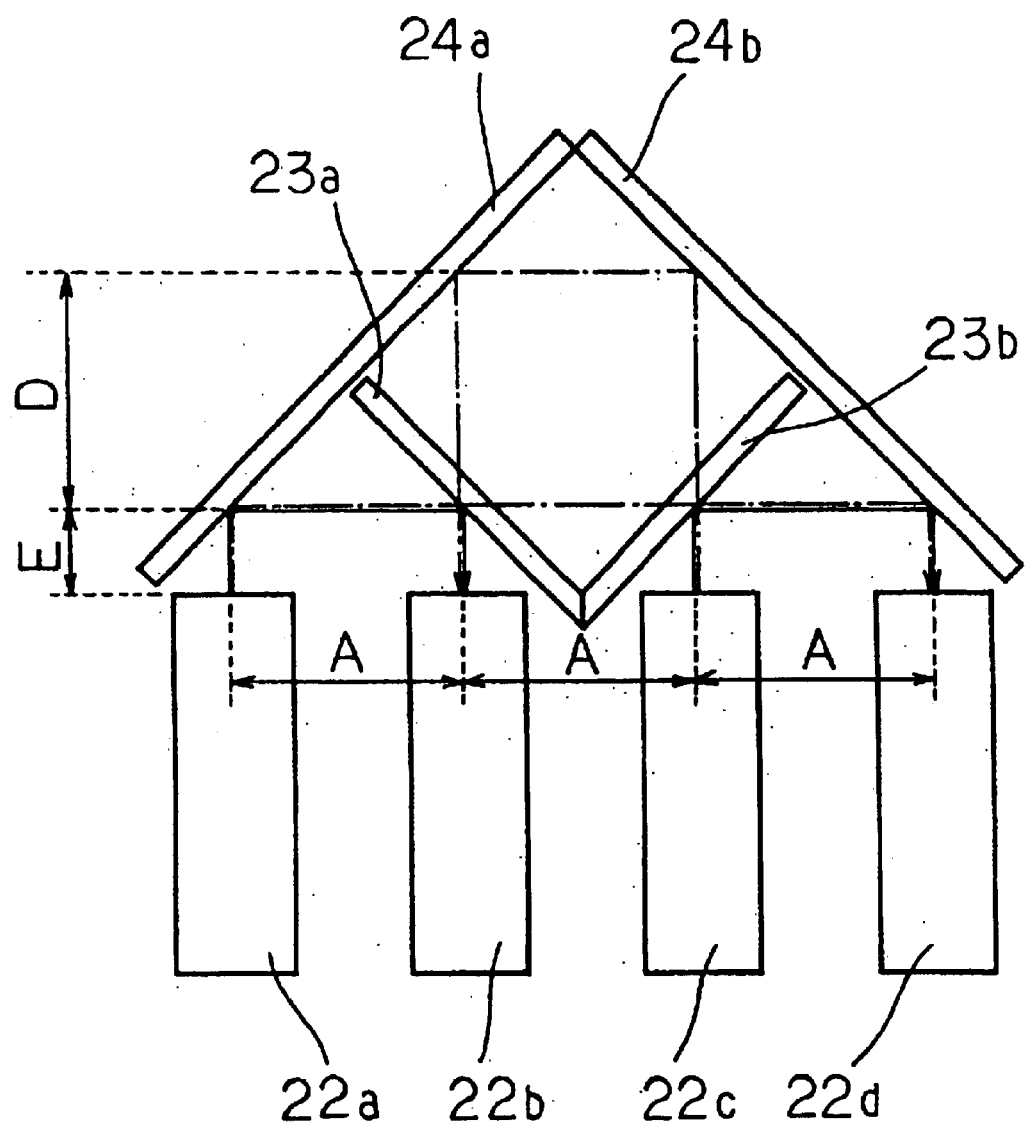
FIG. 12 is a typical view of a main portion of the conventional optical switch shown in FIG. 11.
Figure 15A:
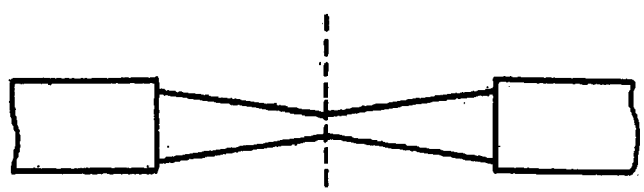
FIGS. 15A–15C are views explaining the optical connection between a pair of optical fibers.
Figure 15B:
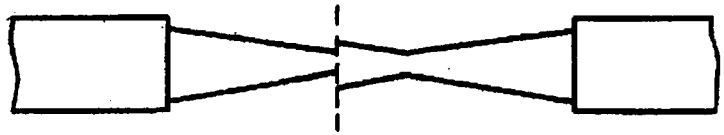
Figure 15C:
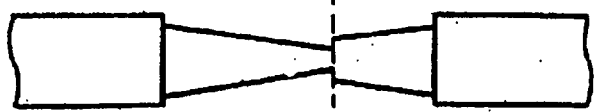
Figure 16:
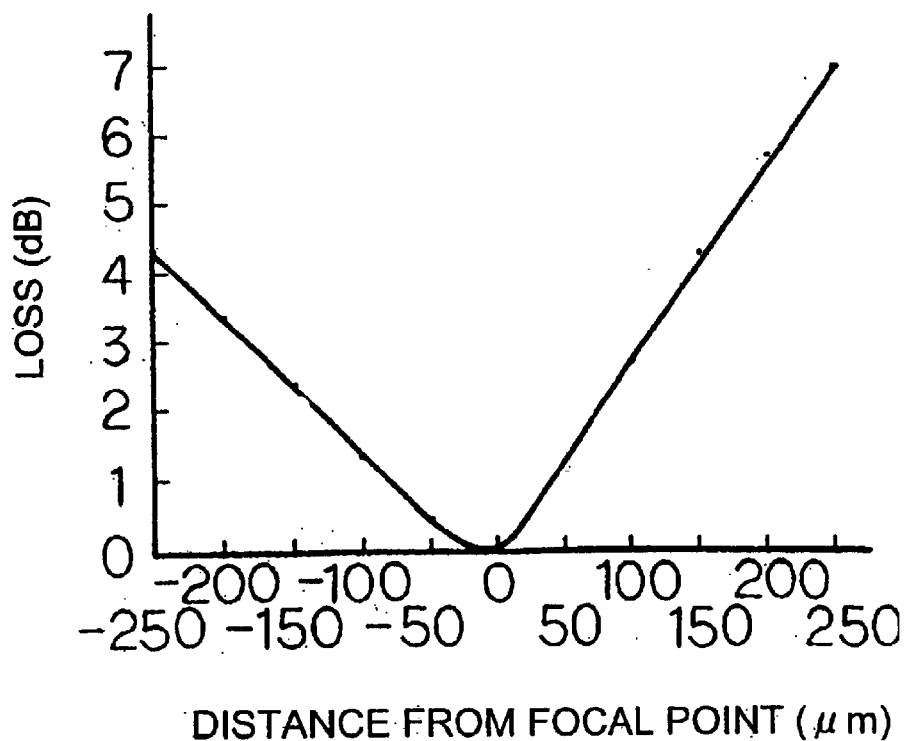
FIG. 16 is a graph showing the relation of the distance of an optical connecting position between the pair of optical fibers from the focal point and loss.

In this optical switch, in the state shown in FIG. 10, for example, as shown by the solid line, the beam emitted from the optical fiber 2 is reflected on the movable mirror 19a and is further reflected on the movable mirror 19d and is incident to the optical fiber 5. The beam emitted from the optical fiber 4 is reflected on the movable mirror 19c and is further reflected on the movable mirror 19b and is incident to the optical fiber 3. Thus, an optical path from the optical fiber 2 to the optical fiber 5 and an optical path from the optical fiber 4 to the optical fiber 3 are formed. When the unillustrated driving means moves the movable portion, the movable mirrors 19a to 19d are moved to positions unopposed to the tip portions of the optical fibers 2 to 5. Therefore, for example, as shown by the one-dotted chain line, the beam emitted from the optical fiber 2 is reflected on the fixing mirror 18a and is further reflected on the fixing mirror 18b and is incident to the optical fiber 3. The beam emitted from the optical fiber 4 is reflected on the fixing mirror 18c and is further reflected on the fixing mirror 18d and is incident to the optical fiber 5. Thus, an optical path from the optical fiber 2 to the optical fiber 3 and an optical path from the optical fiber 4 to the optical fiber 5 are formed.

In the state shown in FIG. 10, the optical path length of the optical path from the optical fiber 2 to the optical fiber 5 is F+A+B+C+F=A+B+C+2F, and the optical path length of the optical path from the optical fiber 4 to the optical fiber 3 is F+E+B+E+F=B+2E+2F. At the moving time of the movable mirrors 19a to 19d, the optical path length of the optical path from the optical fiber 2 to the optical fiber 3 is F+E+D+A+D+E+F=A+2D+2E+2F, and the optical path length of the optical path from the optical fiber 4 to the optical fiber 5 is F+E+D+C+D+E+F=C+2D+2E+2F. Accordingly, the three optical path lengths among the considered four optical paths are equal to each other by setting the relative position relation of the respective optical fibers 2 to 5, the fixing mirrors 18a to 18d and the movable mirrors 19a to 19d to A=C and A+B=2D+2F. In the case of the add-drop system, for example, if the optical fibers 2 to 5 are set to the order of "IN", "DROP", "ADD" and "OUT", the optical fibers 2 to 5 can be constructed such that the optical path lengths of three optical paths "IN"-"OUT", "ADD"-"OUT" and "IN"-"DROP" are set to be equal to each other, and only the optical path length of the optical path. "ADD"-"DROP" is slightly short. Table 6 shows its concrete design example.

TABLE 6

Design example of fourth embodiment mode
(In general, A, B, C = 125 to 500 μm, and D, E, F = 0 to 250 μm are set.)

| | |
|---|---|
| A | 150 |
| B | 300 |
| C | 150 |
| D | 125 |
| E | 100 |
| F | 50 |
| optical fiber 2→3 A + 2D + 2E + 2F 700 | |
| optical fiber 4→5 C + 2D + 2E + 2F 700 | |
| optical fiber 2→5 A + B + C + 2F 700 | |
| optical fiber 4→3 B + 2E + 2F 600 | |
| A | 150 |
| B | 250 |
| C | 150 |
| D | 125 |
| E | 75 |
| F | 50 |
| optical fiber 2→3 A + 2D + 2E + 2F 650 | |
| optical fiber 4→5 C + 2D + 2E + 2F 650 | |
| optical fiber 2→5 A + B + C + 2F 650 | |
| optical fiber 4→3 B + 2E + 2F 500 | |
| A | 150 |
| B | 200 |
| C | 150 |
| D | 125 |
| E | 50 |
| F | 50 |
| optical fiber 2→3 A + 2D + 2E + 2F 600 | |
| optical fiber 4→5 C + 2D + 2E + 2F 600 | |
| optical fiber 2→5 A + B + C + 2F 600 | |
| optical fiber 4→3 B + 2E + 2F 400 | |
| A | 150 |
| B | 150 |
| C | 150 |
| D | 100 |
| E | 50 |
| F | 50 |
| optical fiber 2→3 A + 2D + 2E + 2F 550 | |
| optical fiber 4→5 C + 2D + 2E + 2F 550 | |
| optical fiber 2→5 A + B + C + 2F 550 | |
| optical fiber 4→3 B + 2E + 2F 350 | |
| A | 150 |
| B | 150 |
| C | 200 |
| D | 50 |
| E | 125 |
| F | 50 |
| optical fiber 2→3 A + 2D + 2E + 2F 600 | |
| optical fiber 4→5 C + 2D + 2E + 2F 600 | |
| optical fiber 2→5 A + B + C + 2F 600 | |
| optical fiber 4→3 B + 2E + 2F 550 | |
| A | 150 |
| B | 150 |
| C | 150 |
| D | 50 |
| E | 100 |
| F | 50 |
| optical fiber 2→3 A + 2D + 2E + 2F 550 | |
| optical fiber 4→5 C + 2D + 2E + 2F 550 | |
| optical fiber 2→5 A + B + C + 2F 550 | |
| optical fiber 4→3 B + 2E + 2F 450 | |

In accordance with this Table 6, similar to the third embodiment mode, the number of movable mirrors is increased, but the only different optical path length of the optical path "ADD"-"DROP" can be also set to be very close to the optical path lengths of the other three optical paths. The same effects as the first embodiment mode can be substantially obtained except for this.

In this embodiment mode, for example, the optical fiber 2 is a first optical fiber and one of the optical fibers 3 and is a second optical fiber and the other is a third optical fiber, and the optical fiber 4 is a fourth optical fiber. In this case, the fixing mirrors 18a and 18b constitute a fixing mirror means, and the fixing mirrors 18c and 18d constitute another fixing mirror means, and the movable mirrors 19a and 19d constitute a movable mirror means, and the movable mirrors 19b and 19c constitute another movable mirror means.

The present invention is not limited to the four embodiment modes explained above, but the optical fiber, the fixing mirror and the movable mirror can be arranged in various considered position relations. In any case, the optical fiber, the fixing mirror and the movable mirror are arranged such that all optical paths except for at least one optical path among many constructible optical paths have the same optical path length. Thus, it is possible to realize an optical switch particularly suitable for optical communication of the add-drop system and able to preferably propagate light. The construction that the optical fiber, the fixing mirror and the movable mirror are arranged so as to set the optical path lengths of all the constructible optical paths to be equal to each other, is also included in the technical idea of the present invention. In this case, for example, it is preferable to make an adjustment in which the angle of each mirror is finely set, etc. instead of the arrangement of inclining all the mirrors 45 degrees with respect to the optical axis as in each of the above embodiment modes. With respect to the optical path length of each optical path, a suitable size is actually selected in consideration of the characteristics of the used fiber collimator, the diameter of the fiber, the size of each mirror, etc. The number of optical fibers, the respective uses (incident side, emitting side, etc.), the mode of the driving means of the movable mirror, etc. can be freely changed.

In the present invention, the optical path lengths of all the constructible optical paths, or the optical path lengths of all the constructible optical paths except for one constructible optical path are set to be equal to each other by combining the respective optical fibers. With respect to these optical paths, a preferable propagating state of light can be secured. In the optical communication of the add-drop system, there is no problem even when the propagating state of light is bad in only one optical path (optical path of ADD-DROP) Accordingly, the optical communication of the add-drop system is particularly suitable for the application of the present invention.

Further, in the present invention, each mirror can be made compact and the mirror arranging area can be reduced so that the tip portions of the optical fibers can be set to be closer to each other and the optical path length can be shortened. Thus, the allowance ranges with respect to the shifts of the positions and the angles of the optical fiber and each mirror are increased. Further, since the movable mirror is compact, the entire movable portion can be made compact and light in weight and switching speed can be increased by raising resonance frequency. Further, the output of the driving means such as an electromagnet, etc. can be also reduced and restrained.

Further, in the present invention, since one optical switch device has plural functions, the arranging area and cost can be reduced.

What is claimed is:

1. An optical switch comprising:
   at least first, second, and third optical fibers disposed generally parallel to each other and spaced at non-equal intervals in a direction substantially perpendicular to an optical axis of each of the optical fibers, the optical fibers having tip portions disposed approximately along a straight line extending in a direction substantially perpendicular to the optical axis of each of the optical fibers;

first guiding means non-movably mounted in front of the tip portions of the optical fibers for guiding a beam of light emitted from the first optical fiber to the second optical fiber along a first optical path disposed between the tip portion of the first optical fiber and the tip portion of the second optical fiber; and second guiding means mounted for undergoing movement to a position in front of the tip portions of the optical fibers for guiding the beam emitted from the first optical fiber to the third optical fiber along a second optical path disposed between the tip portion of the first optical fiber and the tip portion of the third optical fiber so that a length of the second optical path is substantially equal to a length of the first optical path.

2. An optical switch according to claim 1; further comprising at least a fourth optical fiber having a tip portion disposed approximately along the straight line; and further comprising third guiding means non-movably mounted in front of the tip portions of the optical fibers for guiding the beam emitted from the fourth optical fiber to the third optical fiber, and fourth guiding means mounted for undergoing movement to a position in front of the tip portions of the optical fibers for guiding a beam emitted from the fourth optical fiber to the second optical fiber.

3. An optical switch according to claim 2; wherein the third guiding means guides the beam emitted from the fourth optical fiber to the third optical fiber along a third optical path disposed between the tip portion of the fourth optical fiber and the tip portion of the third optical fiber, and the fourth guiding means guides the beam emitted from the fourth optical fiber to the second optical fiber along a fourth optical path disposed between the tip portion of the fourth optical fiber and the tip portion of the second optical fiber; and wherein a length of at least one of the third optical path and the fourth optical path is substantially equal to a the length of each of the first and second optical paths.

4. An optical switch according to claim 3; wherein the optical switch comprises an optical communication component of an add-drop system where the first optical fiber is set to IN, one of the second optical fiber and the third optical fiber is set to OUT, the other of the second optical fiber and the third optical fiber is set to DROP, and the fourth optical fiber is set to ADD.

5. An optical switch according to claim 4; wherein only one of the third optical path when the third optical fiber is set to DROP and the fourth optical path when the second optical fiber is set to DROP has a length which is different from the other of the optical paths.

6. An optical switch according to claim 4; wherein the third optical path when the third optical fiber is set to DROP or the fourth optical path when the second optical fiber is set to DROP is interrupted.

7. An optical switch according to claim 1; wherein the first guiding means comprises a plurality of first mirrors disposed at an angle of 45 degrees with respect to an optical axis of the optical fibers; and wherein the second guiding means comprises a plurality of second mirrors disposed at an angle of 45 degrees with respect to the optical axis of the optical fibers when the second mirrors are disposed at the position in front of the tip portions of the optical fibers.

8. An optical switch according to claim 1; wherein each of the first and second guiding means comprises a plurality of mirrors; and further comprising a lens functional part disposed between at least one of the optical fibers and the mirrors for converging the beam emitted from the at least one of the optical fibers.

9. An optical switch according to claim 1; wherein the second guiding means comprises a plurality of mirrors; and further comprising control means for controlling movement of the mirrors to adjust the direction of the beam emitted from the first optical fiber to the third optical fiber along the second optical path.

10. An optical switch device comprising:
a plurality of optical switch devices according to claim 1 disposed relative to one another so that an optical axis of each of the optical fibers of the optical switch devices are disposed generally parallel to one another.

11. An optical switch comprising:
at least first second and third optical fibers disposed substantially parallel to each other and spaced at non-equal intervals and having tip portions disposed approximately along a straight line extending in a direction substantially perpendicular to the optical axis of each of the optical fibers;

first guiding means non-movably mounted in front of the tip portions of the optical fibers for guiding a beam of light emitted from the first optical fiber to the second optical fiber along a first optical path disposed between the tip portion of the first optical fiber and the tip portion of the second optical fiber;

second guiding means mounted for undergoing movement to a position in front of the tip portions of the optical fibers for guiding the beam emitted from the first optical fiber to the third optical fiber along a second optical path disposed between the tip portion of the first optical fiber and the tip portion of the third optical fiber so that a length of the second optical path is substantially equal to a length of the first optical path;

at least a fourth optical fiber having a tip portion disposed approximately along the straight line;

third guiding means non-movably mounted in front of the tip portions of the optical fibers for guiding the beam emitted from the fourth optical fiber to the third optical fiber; and fourth guiding means mounted for undergoing movement to a position in front of the tip portions of the optical fibers for guiding a beam emitted from the fourth optical fiber to the second optical fiber;

wherein the third guiding means guides the beam emitted from the fourth optical fiber to the third optical fiber along a third optical path disposed between the tip portion of the fourth optical fiber and the tip portion of the third optical fiber, and the fourth guiding means guides the beam emitted from the fourth optical fiber to the second optical fiber along a fourth optical path disposed between the tip portion of the fourth optical fiber and the tip portion of the second optical fiber; and wherein a length of at least one of the third optical and the fourth optical path is substantially equal to the length of each of the first and second optical paths;

wherein the first and third guiding means comprises a total of at least four mirrors; and wherein the second and fourth guiding means comprise a total of at least four mirrors mounted for simultaneously undergoing movement to a position in front of the tip portions of the optical fibers.

12. An optical switch according to claim 11; wherein each mirror of the first, second, third and fourth guiding means reflects only one beam.

13. An optical switch according to claim 12; wherein each mirror of the second and fourth guiding means has a diameter which is three times or less than a diameter of the beam emitted from the first optical fiber and a diameter of the beam emitted from the fourth optical fiber.

14. An optical switch comprising:

at least first second and third optical fiber disposed substantially parallel to each other and spaced at non-equal intervals and having tip portions disposed approximately along a straight line extending in a direction substantially perpendicular to the optical axis of each of the optical fibers;

first guiding means non-movably mounted in front of the tip portions of the optical fibers for guiding a beam of light emitted from the first optical fiber to the second optical fiber along a first optical path disposed between the tip portion of the first optical fiber and the tip portion of the second optical fiber;

second guiding means mounted for undergoing movement to a position in front of the tip portions of the optical fibers for guiding the beam emitted from the first optical fiber to the third optical fiber along a second optical path disposed between the tip portion of the first optical fiber and the tip portion of the third optical fiber so that a length of the second optical path is substantially equal to a length of the first optical path;

at least a fourth optical fiber having a tip portion disposed approximately along the straight line;

third guiding means non-movably mounted in front of the tip portions of the optical fibers for guiding the beam emitted from the fourth optical fiber to the third optical fiber; and fourth guiding means mounted for undergoing movement to a position in front of the tip portions of the optical fibers for guiding a beam emitted from the fourth optical fiber to the second optical fiber;

wherein the third guiding means guides the beam emitted from the fourth optical fiber to the third optical fiber along a third optical path disposed between the tip portion of the fourth optical fiber and the tip portion of the third optical fiber and the fourth guiding means guides the beam emitted from the fourth optical fiber to the second optical fiber along a fourth optical path disposed between the tip portion of the fourth optical fiber and the tip portion of the second optical fiber; and wherein a length of at least one of the third optical path and the fourth optical path is substantially equal to the length of each of the first and second optical paths;

wherein the first and third guiding means comprise a total of at least four mirrors; and wherein the second and fourth guiding means comprise a total of two mirrors mounted for simultaneously undergoing movement to a position in front of the tip portions of the optical fibers to cooperate with at least one of the mirrors of the first and third guiding means for guiding the beam emitted from the first optical fiber and the beam emitted from the fourth optical fiber along the second optical path and the fourth optical path, respectively.

15. An optical switch according to claim 14; wherein each mirror of the first, second, third and fourth guiding means reflects only one beam.

16. An optical switch according to claim 15; wherein each mirror of the second and fourth guiding means has a diameter which is three times or less than a diameter of the beam emitted from the first optical fiber and a diameter of the beam emitted from the fourth optical fiber.

17. An optical switch comprising:

a main body;

at least first, second and third optical fibers mounted on the main body and disposed substantially parallel to each other with tip portions of the optical fibers disposed approximately along a straight line extending in a direction substantially perpendicular to an optical axis of each of the optical fibers;

first guiding means integrally mounted on the main body for intersecting a beam of light emitted from the first optical fiber and for guiding the beam to the second optical fiber along a first optical path having a preselected length; and second guiding means mounted on the main body for undergoing movement relative to the main body to intersect the beam emitted from the first optical fiber and guide the beam to the third optical fiber along a second optical path having substantially the preselected length.

18. An optical switch according to claim 17; wherein each of the first and second guiding means comprises a plurality of mirrors.

19. An optical switch according to claim 17; further comprising a plurality of grooves formed in the main body; and wherein each of the first, second, and third optical fibers is mounted in a respective one of the grooves.

20. An optical switch according to claim 17; wherein each of the first, second, and third optical fibers has a front part having the tip portion; and wherein the front parts of the first, second, and third optical fibers are disposed generally parallel to one another.

* * * * *